(12) United States Patent
Komatsu et al.

(10) Patent No.: US 9,950,704 B2
(45) Date of Patent: Apr. 24, 2018

(54) DEVICE AND METHOD FOR CHARGING CONTROL

(71) Applicant: HONDA MOTOR CO., LTD., Tokyo (JP)

(72) Inventors: Ryuko Komatsu, Wako (JP); Yuji Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/523,597

(22) PCT Filed: Nov. 4, 2015

(86) PCT No.: PCT/JP2015/005536
§ 371 (c)(1),
(2) Date: May 1, 2017

(87) PCT Pub. No.: WO2016/072091
PCT Pub. Date: May 12, 2016

(65) Prior Publication Data
US 2017/0305404 A1    Oct. 26, 2017

(30) Foreign Application Priority Data

Nov. 4, 2014   (JP) ................................ 2014-224291
Mar. 5, 2015   (JP) ................................ 2015-043635

(51) Int. Cl.
*B60W 10/26*      (2006.01)
*B60L 11/18*       (2006.01)
(Continued)

(52) U.S. Cl.
CPC ........... *B60W 10/26* (2013.01); *B60L 3/0046* (2013.01); *B60L 11/12* (2013.01); *B60L 11/1861* (2013.01);
(Continued)

(58) Field of Classification Search
CPC ............ Y02T 10/7044; Y02T 10/7055; Y02T 10/7077; Y02T 10/7072; B60W 10/26
(Continued)

(56) References Cited

U.S. PATENT DOCUMENTS 5,965,954 A * 10/1999 Johnson .................. B60R 25/04
                                                        180/287
5,977,654 A * 11/1999 Johnson .................. B60R 25/04
                                                        180/287
(Continued)

FOREIGN PATENT DOCUMENTS

JP         H0612932 B2      2/1994
JP         2001297800 A    10/2001
(Continued)

OTHER PUBLICATIONS

Decision to Grant Patent for Japanese Patent Application No. 2016-557456, dated Nov. 7, 2017, 6 pages.
(Continued)

*Primary Examiner* — Jeffrey J Restifo
(74) *Attorney, Agent, or Firm* — Armstrong Teasdale LLP

(57) ABSTRACT

Provided is a charging control device that allows the actual state of charge of a secondary battery to converge quickly to an upper limit value given as a control center value when the actual state of charge is higher than the upper limit value so that charging may be performed in an efficient manner and fuel economy may be improved. The charging control device (10) includes a charge/discharge integration unit (23) for computing an integrated charge/discharge value (IW) of the secondary battery, a charge control unit (26) for controlling the charging of the secondary battery such that the recognized state of charge is maintained at a prescribed upper limit value (80%) lower than a fully charged state (100%) by switching a generation voltage of a generator. When a disconnection of a terminal of the secondary battery
(Continued)

is detected by a terminal disconnection detection unit (25), the charge control unit (26) prohibits the charging of the secondary battery from then on until the integrated charge/discharge value reaches a prescribed discharge value (−20%).

6 Claims, 13 Drawing Sheets

(51) Int. Cl.
| | | |
|---|---|---|
| *H01M 10/48* | (2006.01) | |
| *H01M 10/44* | (2006.01) | |
| *B60W 10/08* | (2006.01) | |
| *B60W 10/06* | (2006.01) | |
| *B60L 11/12* | (2006.01) | |
| *B60L 3/00* | (2006.01) | |
| *H01M 10/42* | (2006.01) | |

(52) U.S. Cl.
CPC ............ *B60W 10/06* (2013.01); *B60W 10/08* (2013.01); *H01M 10/44* (2013.01); *H01M 10/48* (2013.01); *H01M 2010/4271* (2013.01)

(58) Field of Classification Search
USPC ............... 180/65.29; 320/161, 162, 132, 104
See application file for complete search history.

(56) References Cited

U.S. PATENT DOCUMENTS

| | | | | |
|---|---|---|---|---|
| 6,757,598 B2 * | 6/2004 | Okoshi | ................. | B60K 6/365 |
| | | | | 180/65.1 |
| 6,781,251 B2 * | 8/2004 | Takaoka | ................. | B60K 6/365 |
| | | | | 180/65.21 |
| 6,920,948 B2 * | 7/2005 | Sugiura | ............... | B60L 11/1881 |
| | | | | 180/65.28 |
| 7,617,895 B2 * | 11/2009 | Lee | ..................... | B60L 15/2045 |
| | | | | 180/65.265 |
| 7,775,310 B2 * | 8/2010 | Andri | ....................... | B60K 6/48 |
| | | | | 180/65.28 |
| 7,880,442 B2 * | 2/2011 | Takeuchi | .............. | H01M 10/06 |
| | | | | 180/116 |
| 8,006,788 B2 * | 8/2011 | Soma | .................... | B60L 11/123 |
| | | | | 180/65.29 |
| 8,022,674 B2 * | 9/2011 | Miura | ................... | B60W 10/26 |
| | | | | 180/65.29 |
| 8,047,316 B2 * | 11/2011 | Takami | ..................... | B60K 6/46 |
| | | | | 180/65.29 |
| 8,818,595 B2 * | 8/2014 | Tamagawa | ............. | B60K 6/442 |
| | | | | 180/65.285 |
| 8,820,445 B2 * | 9/2014 | Kikuchi | ................ | B60L 11/123 |
| | | | | 180/65.265 |
| 8,820,446 B2 * | 9/2014 | Kusumi | ................... | B60K 6/46 |
| | | | | 180/65.27 |
| 8,829,848 B2 * | 9/2014 | Kotooka | .................. | B60K 6/46 |
| | | | | 180/65.29 |
| 8,989,939 B2 * | 3/2015 | Aoki | ....................... | B60K 6/445 |
| | | | | 180/168 |
| 9,000,732 B2 * | 4/2015 | Kim | ................... | G01R 31/3679 |
| | | | | 320/162 |
| 9,263,900 B2 * | 2/2016 | Ju | .......................... | H02J 7/0029 |
| 9,300,018 B2 * | 3/2016 | Watson | ............... | H01M 2/1072 |
| 9,350,186 B2 * | 5/2016 | Ju | .......................... | H02J 7/0063 |
| 9,457,686 B2 * | 10/2016 | Chang | ................. | B60L 11/1862 |
| 9,527,401 B2 * | 12/2016 | Le | ........................ | H01M 10/441 |
| 9,527,402 B2 * | 12/2016 | Wyatt | .................. | B60L 11/1868 |
| 9,550,432 B2 * | 1/2017 | Hisano | ................. | B60L 11/1861 |
| 9,577,458 B2 * | 2/2017 | Kaita | ................... | B60L 11/1861 |
| 9,649,950 B2 * | 5/2017 | Katayama | ........... | B60L 11/1868 |
| 9,718,375 B2 * | 8/2017 | Le | ......................... | B60L 11/1868 |
| 9,731,619 B2 * | 8/2017 | Tashiro | ................ | B60L 11/1868 |
| 9,793,722 B2 * | 10/2017 | Tamura | ................. | B60R 16/033 |
| 9,834,100 B2 * | 12/2017 | Hikiri | ................. | B60L 11/1809 |
| 9,855,854 B2 * | 1/2018 | Nomoto | ............. | B60L 11/1861 |

FOREIGN PATENT DOCUMENTS

| | | |
|---|---|---|
| JP | 2004328934 A | 11/2004 |
| JP | 2006036003 A | 2/2006 |
| JP | 2010035327 A | 2/2010 |
| WO | 2009054318 A1 | 4/2009 |

OTHER PUBLICATIONS

International Search Report for Application No. PCT/JP2015/005536, dated Jan. 12, 2016, 4 pages.

* cited by examiner

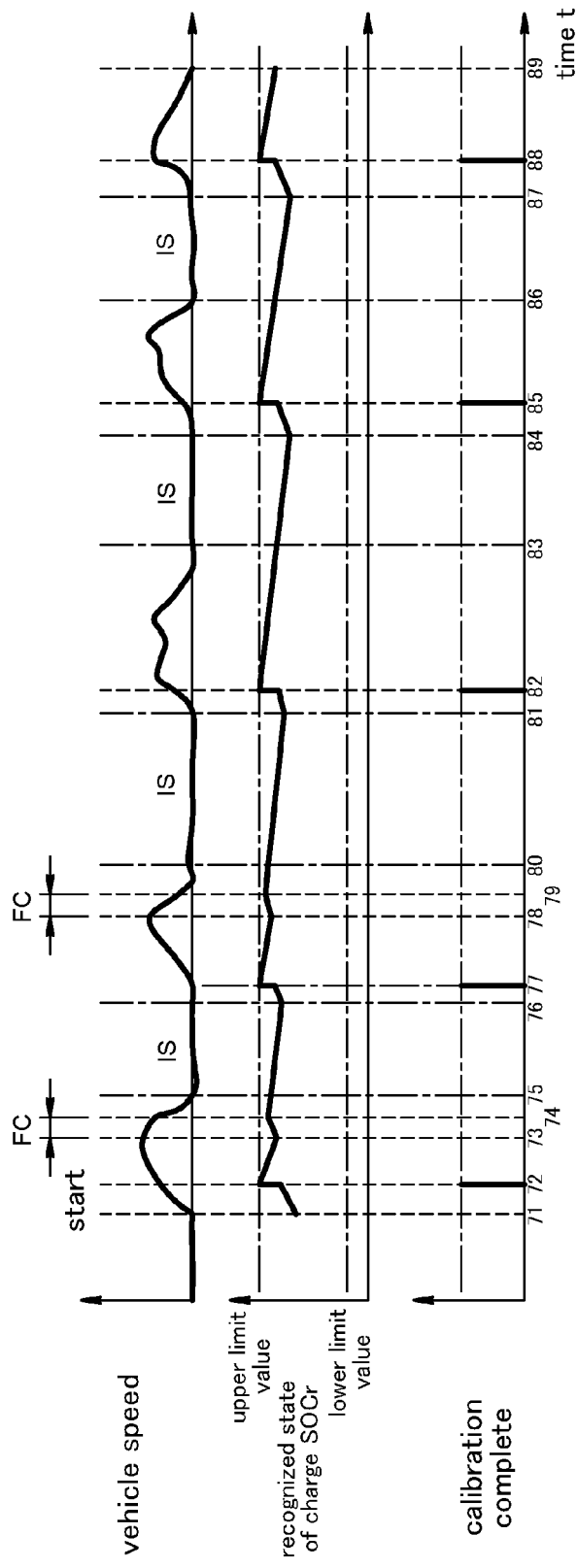
Fig. 13 time chart similar to Figure 11 for the example for comparison

DEVICE AND METHOD FOR CHARGING CONTROL

TECHNICAL FIELD

The present invention relates to a device and a method for controlling the charging of a secondary battery by using a generator powered by an internal combustion engine.

BACKGROUND ART

As a method for controlling the charging of a secondary battery (rechargeable battery) mounted on a vehicle, it is known to maintain a state of charge of the secondary battery to a prescribed target value smaller than the charge capacity of the secondary battery. See Patent Document 1. According to this prior invention, because the energy regenerated from braking cannot be efficiently utilized if the secondary battery is always fully charged to the charge capacity, a certain margin is left in the secondary battery so that the electric energy produced by a regenerative braking may be charged to the secondary battery for efficient utilization of the electric energy. By using the charged or stored electric energy as an auxiliary drive power, the fuel economy of the engine can be improved.

In recent years, vehicles are often provided with an idle stop function which automatically stops the engine when the vehicle has come to a stop, and automatically restarts the engine when the vehicle is to start off. In an idle stop vehicle, because the battery is required to supply the electric power for the vehicle when the engine is not running, and for restarting the engine, the battery is required to be charged and discharged very frequently. Therefore, various forms of charging control devices have been developed for the purpose of properly managing the battery of idle stop vehicles. In a known charging control device of this type, the battery is charged whenever the engine is restarted in an idle stop operation. See Patent Document 2. In the charging control device disclosed in Patent Document 2, the battery is charged every time an idle stop operation is performed (restarting the engine), and the charging of the battery is terminated when the battery is fully charged, or when the charge current has fallen below a prescribed threshold vale, and the battery voltage has continued to exceed a prescribed threshold value for a prescribed time period.

PRIOR ART DOCUMENT(S)

Patent Document(s)

Patent Document 1: JPH06-12932B
Patent Document 2: JP2004-328934A

BRIEF SUMMARY OF THE INVENTION

Task to be Accomplished by the Invention

The state of charge (SOC) is a normalized value of the remaining charge of the battery with the fully charged state and fully depleted state given by 100% and 0%, respectively. As discussed in Patent Document 2, the state of charge is determined from the charge current and the battery voltage. The term "determine" may normally mean "estimate" or "deduce", but in the following disclosure, is intended to mean the act of judging a state of charge of a battery from the charge current and the battery voltage as opposed to the term "recognize" which in the following disclosure, is intended to mean the act of judging a state of charge of a battery from an integrated value of a charge and discharge current detected by a current sensor, for instance. When determining (recognizing) the state of charge from the charge and discharge current of the battery, any error in determining the initial state of charge causes a corresponding error in the estimated state of charge. Therefore, in the charging control devices mounted on some of the commercially available vehicles, the state of charge is determined from the charge current (and the charge voltage) detected when charging the battery, and when the recognized (retained) state of charge deviates from the determined state of charge, the recognized state of charge is corrected (calibrated).

In determining the state of charge from the charge current and the battery voltage, if the state of charge is near the fully charged state, the battery voltage rises, and the charge current decreases to such an extent that an accurate determination of the state of charge from the charge current becomes difficult. Therefore, the charging control devices mounted on the commercially available vehicles are often configured to regard the state of charge to be at a prescribed state of charge (such as 80%) which is lower than the fully charged state when the state of charge is so high that an accurate determination of the state of charge becomes difficult.

Also, as the state of charge becomes higher, the battery voltage rises and the charge current diminishes so that the efficiency of charging the battery declines. Therefore, in the charging control devices mounted on the commercially available vehicles, an upper limit value (such as 80%) is often set to the state of charge of the battery, and a control process is executed in such a manner that the upper limit value is set as a central value for the control process (control target value), and the state of charge of the battery is maintained at the upper limit value (normal control process). When the state of charge is less than the upper limit value, and the charging efficiency is therefore high, the battery may be charged at an appropriate timing such as when a fuel cut operation is being performed.

However, in such a charging control device, if the battery is removed for recharging or replacement, and a fresh battery (which may be the same battery which is recharged or a new battery) is reconnected, even when the fresh battery is fully charged, the state of charge is regarded as being at the prescribed state of charge. In such a case, it is necessary to lower the state of charge of the reconnected battery to the upper limit value to enable the state of charge to be accurately determined. On the other hand, according to the control process of such a charging control device, it is necessary to charge the battery for the inaccurately recognized state of charge to be recognized anew and to be calibrated. It is conceivable to charge the battery after an idle stop operation, and determine the state of charge during this charging process by using the technology disclosed in Patent Document 2. However, according to this arrangement, the battery is required to be charged every time after an idle stop (or after each restarting of the engine). Therefore, a relatively long time period will be required for the actual state of charge of the battery to decrease to the upper limit value. In other words, a long time period is required for lowering the state of charge of the battery to the upper limit value so that an inefficient charging is continued for a long period of time, and the fuel economy of the vehicle is adversely affected.

Means to Accomplish the Task

The present invention was made in view of such problems of the prior art, and has a primary object to provide a device and a method for charging control that allow the actual state of charge of a secondary battery to converge quickly to an upper limit value given as a control center value when the actual state of charge is higher than the upper limit value so that charging may be performed in an efficient manner and fuel economy may be improved.

To achieve such an object, the present invention provides a charging control device (10) for controlling a charging of a secondary battery (13) with a generator (14) driven by an engine (11), comprising: a charge current detection unit (15b) for detecting (S2) a charge current (Ic) supplied to the secondary battery; a discharge current detection unit (15a) for detecting (S2) a discharge current (Id) supplied from the secondary battery; a charge/discharge integration unit (23) for computing (S3) an integrated charge/discharge value (IW) of the secondary battery according to the charge current and the discharge current; a state of charge recognition unit (24) for recognizing a state of charge of the secondary battery according to the integrated charge/discharge value as a recognized state of charge (SOCr); a charge control unit (26) for controlling the charging (S47-S56) of the secondary battery such that the recognized state of charge is maintained at a prescribed upper limit value (80%) lower than a fully charged state (100%) by switching a generation voltage of the generator; and a terminal disconnection detection unit (16, 25) for detecting (S21-S23) a disconnection of a terminal of the secondary battery; wherein the charge control unit is configured to prohibit (S68-S70) the charging of the secondary battery when the disconnection of the terminal of the secondary battery is detected (S31: Yes) from then on until the integrated charge/discharge value reaches a prescribed discharge value (−20%).

The present invention also provides a charging control method for controlling a charging of a secondary battery (13) with a generator (14) driven by an engine (11), comprising the steps of detecting (S2) a charge current (Ic) supplied to the secondary battery; detecting (S2) a discharge current (Id) supplied from the secondary battery; computing (S3) an integrated charge/discharge value (IW) of the secondary battery according to the charge current and the discharge current; recognizing a state of charge of the secondary battery according to the integrated charge/discharge value as a recognized state of charge (SOCr); controlling the charging (S47-S56 (t19-t23)) of the secondary battery such that the recognized state of charge is maintained at a prescribed upper limit value (80%) lower than a fully charged state (100%) by switching a generation voltage of the generator; detecting (S21-S23) a disconnection of a terminal of the secondary battery; and prohibiting (S68-S70) the charging of the secondary battery when the disconnection of the terminal of the secondary battery is detected (S31: Yes) until the integrated charge/discharge value reaches a prescribed discharge value (−20%).

According to such an arrangement, the secondary battery can be charged in such a manner that the recognized state of charge is maintained at the upper limit value which is lower than the fully charged state. When a disconnection of the secondary battery is detected, the charging of the secondary battery is prohibited until the integrated charge/discharge value reaches the prescribed discharge value. Therefore, the actual state of charge can be quickly converged to the upper limit value so that the secondary battery can be charged in an efficient manner, and the fuel economy is prevented from being adversely affected.

In this invention, it may be arranged such that the charge control device further comprises a state of charge determination unit (23) for determining (S5) a state of charge of the secondary battery according to the charge current while the secondary battery is being charged, wherein the charge/discharge integration unit is configured to calibrate the recognized state of charge according to the state of charge determined by the state of charge determination unit, the charge control unit is configured to charge (S42-S43, S61-S62) the secondary battery over a prescribed determination time period (Tr) required for the state of charge determination unit to determine the state of charge immediately after a starting of the engine, and the charge control unit is configured to prohibit (S69) the charging of the secondary battery when a disconnection of the terminal of the secondary battery is detected (S31: Yes), and the state of charge of the reconnected secondary battery determined after a starting of the engine is higher than the prescribed upper limit value (S63: Yes).

According to this arrangement, even when the disconnection of the terminal of the secondary battery is detected, the charging of the secondary battery is not prohibited if the state of charge of the reconnected secondary battery immediately after the engine is started is lower than the upper limit value. Therefore, the charging of the reconnected secondary battery can be performed so that the recognized state of charge may be maintained at the upper limit value.

In the present invention, it may be arranged such that the charging control device is mounted on a vehicle (1), and the charge control unit is configured to charge the secondary battery during a fuel cut operation of the vehicle (S53, S87), and wherein the charge/discharge integration unit is configured to calibrate (S7-S13) the recognized state of charge when a disconnection of the terminal of the secondary battery is detected (S31: Yes) by using the state of charge of the reconnected secondary battery determined by the state of charge determination unit during the charging (S72, S87) of the secondary battery in the fuel cut operation.

Thus, the secondary battery is charged during the fuel cut operation, and even when the disconnection of the terminal of the secondary battery is detected, the recognized state of charge can be calibrated while the secondary battery is being charged in a fuel cut operation. As the recognized state of charge is calibrated while the secondary battery is being charged in the fuel cut operation, no fuel is required to be used for the purpose of calibration so that the fuel economy is not adversely affected.

In the present invention, it may be arranged such that the charging control device is mounted on an idle stop vehicle, and the charge control unit is configured to force (S92-S93) the charging of the secondary battery over the prescribed determination time period when the disconnection of the terminal of the secondary battery is detected (S31: Yes), and the fuel cut operation is not performed (S86: No) before elapsing (S91: No) of a prescribed time period (Td) from a time point of restarting the engine in an idle stop operation.

According to this arrangement, a state where no fuel cut operation takes place or where the charge/discharge integration unit is unable to calibrate the recognized state of charge using the state of charge of the reconnected secondary battery is prevented from lasting for a prolonged period time from a restarting of the engine in an idle stop operation. Thereby, a state where the recognized state of charge keeps falling while deviating from the actual state of charge can be prevented from persisting.

In the present invention, it may be arranged such that the charge control unit is configured to force (S92-S93) the charging of the reconnected secondary battery over the prescribed determination time period when the disconnection of the secondary battery is detected (S31: Yes), and the fuel cut operation lasting for more than the prescribed determination time period has not been performed (S88: Yes) before elapsing of the prescribed time period from the time point of restarting of the engine in the idle stop operation (S91: No).

Even when the fuel cut operation is performed before the elapsing of the prescribed time period from the restarting of the engine in the idle stop operation, if the fuel cut operation does not last for more than the prescribed determination time period required for the determination of the state of charge, the charge/discharge integration unit is unable to calibrate the recognized state of charge. However, according to this arrangement, even when a fuel cut operation that last for more than the prescribed determination time period is not performed, the charge/discharge integration unit is enabled to calibrate the recognized state of charge.

In this invention, it may be arranged such that the charge control unit is configured, when the disconnection of the terminal of the secondary battery is detected (S31: Yes), and a fuel cut operation lasting for more than the prescribed determination time period is not performed before a prescribed number (three, for instance) of idle stop operations have been performed (S84: Yes), to force (S92-S93) the charging of the reconnected secondary battery for the prescribed determination time period after the engine is restarted for the prescribed number of times in the idle stop operations.

If the disconnection of the terminal of the secondary battery is detected, and a state where the fuel cut operation does not take place lasts for a prolonged period of time without the recognized state of charge being calibrated, the recognized state of charge may reach the discharge lower limit value during the idle stop operations where the state of charge tends to drop, and this may cause the engine to be abruptly restarted in order to force the charging of the secondary battery. According to this arrangement, this situation is prevented from occurring by having the charge control unit force the charging of the reconnected secondary battery after the prescribed number of restarting of the engine in the idle stop operations. Also, before the recognized state of charge reaches the lower limit value, the charge/discharge integration unit is enabled to calibrate the state of charge.

Effect of the Invention

Thus, the present invention provides a device for charging control that allows a secondary battery to be charged such that the state of charge of the secondary battery is maintained at the prescribed upper limit value which is lower than the fully charged state of the secondary battery, and the actual state of charge of the secondary battery may be caused to converge quickly to the upper limit value when the actual state of charge is higher than the upper limit value so that charging may be performed in an efficient manner and fuel economy may be improved.

BRIEF DESCRIPTION OF THE DRAWINGS

FIG. 13 is a time chart showing the state of charge in the charging control process according to an example for comparison similar to FIG. 11.

EMBODIMENTS FOR CARRYING OUT THE INVENTION

A preferred embodiment of the present invention is described in the following with reference to the appended drawings.

Figure 1:
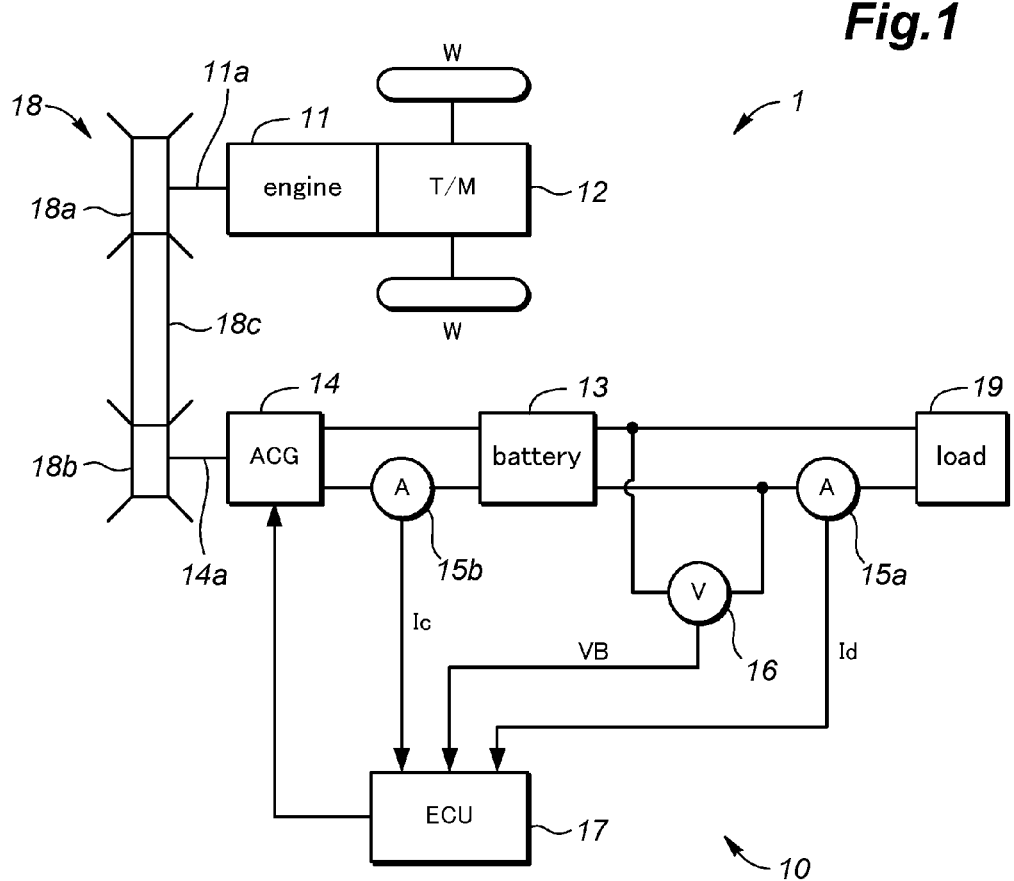
FIG. 1 is a simplified diagram of a charging control device according to the present invention.

As shown in FIG. 1, a charging control device 10 is mounted on an idle stop vehicle 1 which is configured to transmit a drive force of an engine 11 to driven wheels W of the vehicle 1 via a transmission system 12 (such as a CVT transmission system and a manual transmission system), and is configured to control the charging of a battery 13 (such as a 12 volt lead battery) which mounted on the vehicle for powering various auxiliary devices of the vehicle 1. The charging control device 10 includes, in addition to the battery 13, an AC generator (ACG) 14, current sensors 15a and 15b, a voltage sensor 16 and an ECU (electronic control unit) 17.

The crankshaft 11a of the engine 11 is connected to the rotary shaft 14a of the AC generator 14 via a drive force transmitting unit 18 so that the AC generator 14 is caused to generate electric power by using the drive torque of the engine 11 transmitted to the AC generator 14 via the drive force transmitting unit 18. The drive force transmitting unit 18 may comprise a crankshaft pulley 18a fixedly attached to the crankshaft 11a of the engine 11, a drive shaft pulley 18b corresponding to the crankshaft pulley 18a and fixedly attached to the rotary shaft 14a of the AC generator 14, and a belt 18c passed around the crankshaft pulley 18a and the drive shaft pulley 18b. In other words, the drive force of the engine 11 is transmitted to the AC generator 14 via the crankshaft pulley 18a, the drive shaft pulley 18b and the belt 18c.

The battery 13 is connected to the AC generator 14 which, under command from the ECU 17, converts the AC electric power generated from the drive force of the engine 11 into DC electric power, and charges the battery 13 with this DC electric power. The ECU 17 controls the charging operation or the power generating operation of the AC generator 14 for charging the battery 13 according to an identified state or a recognized state of charge SOCr which will be described hereinafter, the electric energy (watt-hour) supplied to a load 19 which may consist of various pieces of onboard electric equipment such as lamps and a compressor for an air conditioning system or, in other words, the product of the discharge current Id supplied to the load 19, the voltage VB across the terminals of the battery 13 and the time T.

For instance, the ECU 17 is configured to control the AC generator 14 such that the DC voltage produced by the AC generator 14 is 14.5 V when the battery 13 is to be charged, and the DC voltage produced by the AC generator 14 is 12.0 V when the battery 13 is not to be charged. In other words, the ECU 17 switches over the generation voltage command between the normal time when no charging takes place and the time when charging takes place.

For this purpose, the ECU 17 receives detection signals such as a detection signal on the discharge current Id from the battery 13 to the load 19 obtained by the current sensor 15a, a detection signal on a terminal voltage VB of the battery 13 obtained by the voltage sensor 16 and a detection signal on a charge current Ic from the AC generator 14 to the battery 13 obtained by the current sensor 15b. FIG. 1 shows the two current sensors 15a and 15b, but a single current sensor 15 may also be used for detecting both the discharge current Id and the charge current Ic.

The vehicle 1 is additionally provided with an engine ECU (not shown in the drawings) which performs an idle stop control in which the engine 11 is stopped when an intention to stop the vehicle 1 is detected while the vehicle 1 is traveling or when a prescribed engine stop condition is met (such as when the vehicle speed is zero, and the brake pedal is depressed), and the engine 11 is restarted when an intention to drive the vehicle is detected or when a prescribed engine restart condition is met (such as when the brake pedal is released). During an idle stop operation, an idle stop signal IS produced from the engine ECU is forwarded to the ECU 17.

The engine ECU starts the engine 11 in response to an ignition on signal IG-ON, and controls the supply of fuel to the engine 11 and/or a throttle opening depending on the depression stroke of the accelerator pedal. The ignition on signal IG-ON is also supplied to the ECU 17. When a prescribed fuel cut condition is met such as when the depression stroke of the accelerator pedal is reduced to zero while the vehicle 1 is traveling, the engine ECU performs a fuel cut operation or reduces the supply of fuel to the engine 11 to zero. During a fuel cut operation, a fuel cut signal FC is supplied from the engine ECU to the ECU 17.

Figure 2:
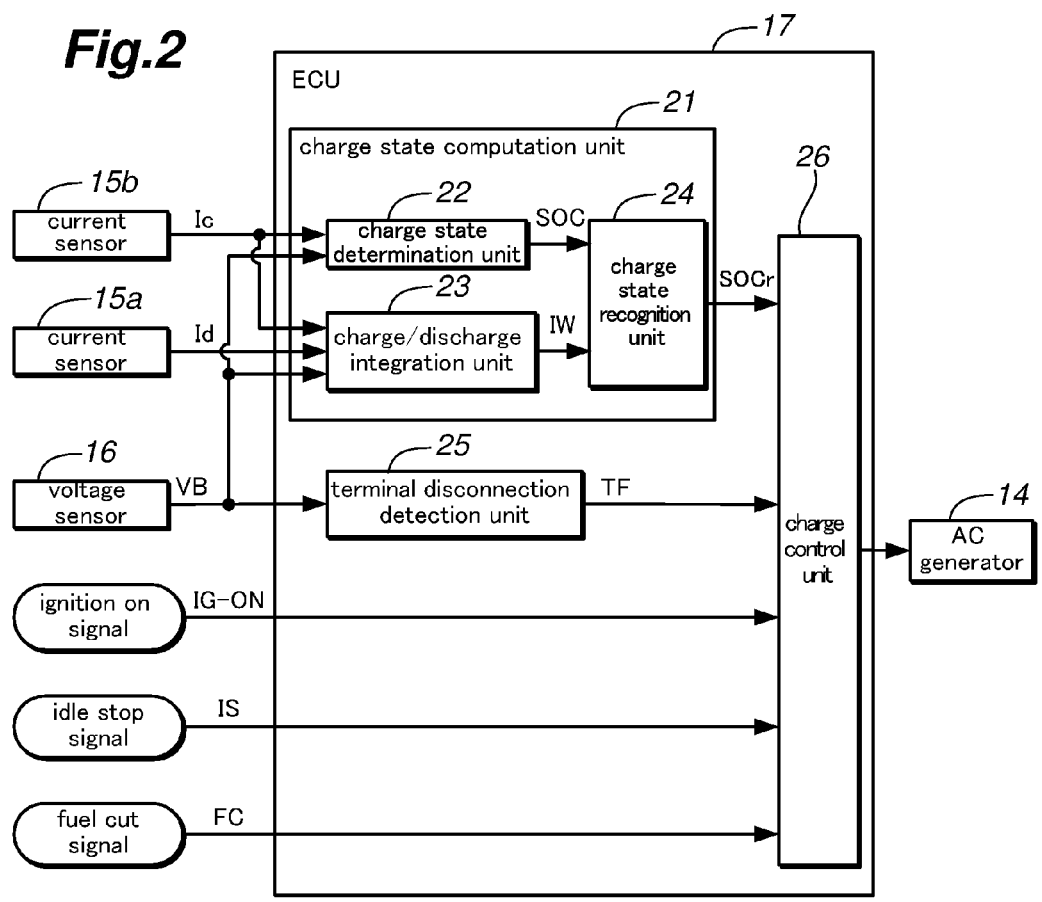
FIG. 2 is a block diagram of the ECU shown in FIG. 1.

The ECU 17 is described in the following with reference to FIG. 2. The detection signal on the charge current Ic from the AC generator 14 to the battery 13 obtained by the current sensor 15b and the detection signal on the terminal voltage VB of the battery 13 obtained by the voltage sensor 16 are supplied to a state of charge computation unit 21. In the state of charge computation unit 21, a charge state determination unit 22 determines the state of charge SOC of the battery 13 according to at least the charge current Ic of the obtained terminal voltage VB (charge voltage) and charge current Ic (which is simply referred to as "according to at least the charge current Ic" in the following description). The charge state determination unit 22 is required to receive the charge current Ic continuously over a prescribed determination time period Tr in order to successfully determine the state of charge SOC. Even when the charge current Ic is received continuously over the prescribed determination time period Tr, if the state of charge SOC of the battery 13 is greater than a prescribed value (such as 80%), the charge state determination unit 22 may be able to be determined that the state of charge SOC is greater than the prescribed value, but may not be able to determine the exact value of the state of charge SOC because there is so little difference in the detected charge current Ic. In such a case, the charge state determination unit 22 regards the state of charge SOC as being equal to the prescribed value (such as 80%). Thus, the state of charge SOC as determined by the charge state determination unit 22 may not agree with the actual state of charge SOC (which will be referred to as "actual state of charge SOCa" in the following description). The timing for determining the state of charge SOC by the state of charge computation unit 21 is described hereinafter.

The detection signal on the discharge current Id from the battery 13 to the load 19 obtained by the current sensor 15a is also forwarded to the state of charge computation unit 21. In the state of charge computation unit 21, a charge/discharge integration unit 23 computes an integrated charge/discharge value IW which is given as a sum of the value obtained by integrating the charge (positive value) supplied to the battery 13 according to the received charge current Ic and terminal voltage VB (charge voltage) and the value obtained by integrating the discharge (negative value) released from the battery 13 according to the received discharge current Id and terminal voltage VB. In the illustrated embodiment, the integrated charge/discharge value IW is evaluated as a ratio (fraction) of the integrated charge/discharge value IW to the storage capacity of the battery 13 as a value corresponding to the state of charge SOC. When the integrated value of the charge is greater than the integrated value of the discharge, the integrated charge/discharge value IW is given as a positive value. When the integrated value of the discharge is greater than the integrated value of the charge, the integrated charge/discharge value IW is given as a negative value.

The state of charge SOC determined by the charge state determination unit 22 and the integrated charge/discharge value of the battery 13 accumulated by the IW charge/discharge integration unit 23 are forwarded to a charge state recognition unit 24. The charge state recognition unit 24 updates (recognizes) the recognized (retained) state of charge SOCr by adding the integrated charge/discharge value IW to the retained recognized state of charge SOC (which may be simply referred to as "recognized state of charge SOCr"). If the charge state recognition unit 24 is configured to update the recognized state of charge SOCr on a regular basis, the charge state recognition unit 24 may be considered as performing the function of the charge/discharge integration unit 23. If the charge state determination unit 22 has determined a state of charge SOC, and the determined state of charge SOC is different from the state of charge SOC determined as the recognized state of charge SOCr, the recognized state of charge SOCr is corrected by replacing the value of the recognized state of charge SOCr with the value of the state of charge SOC which has been determined (in other words, the recognized state of charge SOCr is calibrated to a more correct value according to the determined state of charge SOC). However, when the recognize state of charge SOCr is higher than the prescribed value (80%), and the determined state of charge SOC has reached the prescribed value (including the case of a regarded prescribed value), as the recognized state of charge SOCr is closer to the actual state of charge SOCa than the determined state of charge SOC, the charge state recognition unit 24 retains the recognized state of charge SOCr without any correction. The charge state recognition unit 24 therefore forwards the computed recognized state of charge SOCr to a charge control unit 26.

The terminal voltage VB of the battery 13 produced from the voltage sensor 16 is also forwarded to a terminal disconnection detection unit 25. When the terminal voltage VB of the battery 13 is 0 V, the terminal disconnection detection unit 25 detects that a terminal of the battery 13 has been disconnected. When a terminal of the battery 13 is disconnected, it is possible that the battery 13 has been removed from the vehicle 1. Therefore, when the terminal of the battery 13 is connected once again, the actual state of charge SOCa may be changed. For instance, the battery 13 may have been changed to another battery 13 which is fully charged (actual state of charge SOCa=100%). When a disconnection of a terminal of the battery 13 is detected, the terminal disconnection detection unit 25 forwards a terminal disconnection signal TF to the charge control unit 26.

The charge control unit 26 also receives an ignition on signal IG-ON, an idle stop signal IS and a fuel cut signal FC. Based on these signals, the charge control unit 26 controls the charging (generation voltage) of the AC generator 14. More specifically, upon receiving the ignition on signal IG-ON, the charge control unit 26 charges the battery 13 for the prescribed determination time period Tr so that the charge state recognition unit 24 is enabled to calibrate the recognized state of charge SOCr by determining the state of charge SOC of the battery 13 immediately after the engine 11 has been started.

The charge control unit 26 controls the charging of the battery 13 so that the recognized state of charge SOCr is maintained at the prescribed upper limit value (80% in the illustrated embodiment) which is smaller than the fully charged state (100%) as a normal control process. However, as it is not practical to maintain the recognized state of charge SOCr at the upper limit value at all times, and the commercial acceptability of the vehicle 1 may be impaired, in the illustrated embodiment, a lower limit value (77%) is defined in addition to the upper limit value so that the charging of the battery 13 is discontinued when the recognized state of charge SOCr is greater than the upper limit value (or regarded as being at the upper limit value), and the charging of the battery 13 is forced when the recognized state of charge SOCr is lower than the lower limit value until the recognized state of charge SOCr reaches the upper limit value.

When the recognized state of charge SOCr is between the upper limit value and the lower limit value, the charge control unit 26 charges the battery 13 at a prescribed timing such that the commercial desirability of the vehicle 1 may be enhanced and the fuel economy may be improved. For instance, to such an end, the charge control unit 26 may charge the battery 13 when the fuel cut signal FC is received so that the recognized state of charge SOCr may be brought back to the upper limit value without adversely affecting the fuel economy. During the normal control process of the illustrated embodiment, the charge control unit 26 does not charge the battery 13 after the engine 11 is restarted in an idle stop operation at least when the recognized state of charge SOCr is higher than the upper limit value.

When the terminal disconnection signal TF is received, and the actual state of charge SOCa of the battery 13 is higher than the upper limit valve which is a central value for the control process, the charge control unit 26 performs a discharge control such that the actual state of charge SOCa of the battery 13 may be quickly lowered to the upper limit value.

In the discharge control process, the charge control unit 26 operates similarly as in the normal control process in charging the battery 13 over the prescribed determination time period Tr following the reception of the ignition on signal IG-ON, in stopping the charging when the recognized state of charge SOCr is higher than the lower limit value, and in charging the battery 13 when the recognized state of charge SOCr is lower than the lower limit value.

If the state of charge SOC determined by the charge state determination unit 22 according to at least the charge current Ic is less than the upper limit value (80%) during the charging over the prescribed determination time period Tr following the input of the ignition signal IG-ON, the recognized state of charge SOCr is corrected so that the actual state of charge SOCa is accurately recognized by the ECU 17. Thereafter, the charge control unit 26 terminates the discharge control, and performs the normal control.

When the state of charge SOC determined after the input of the ignition on signal IG-ON is greater than the upper limit value (80%), as the recognized state of charge SOCr may not be accurate, the charge control unit 26 continues the discharge control.

The discharge control is performed as described in the following. The charge control unit 26 basically prohibits the charging of the battery 13 until the integrated charge/discharge value IW of the battery 13 reaches a prescribed discharge amount (−20% which is the difference between the full charge and the upper limit value). For instance, during this period, the charge control unit 26 prohibits the charging of the battery 13 which could otherwise be performed when the recognized state of charge SOCr falls below the lower limit value in order to maintain the recognized state of charge SOCr at the upper limit value and the charging of the battery 13 for making up for the power consumption following the reception of the idle stop signal IS (when the input is lost, or when restarting the engine after an idle stop).

Even during this period, as no fuel is consumed in the fuel cut mode, when the fuel cut signal FC is received, the charge control unit 26 performs the charging. When the fuel cut operation has persisted for the determination time period Tr, it is then possible to determine the state of charge SOC. When the fuel cut operation is not performed before the elapsing of a prescribed time period Td from the restarting of the engine in the idle stop operation, the charge control unit 26 forces the charging of the battery 13 for the determination of the state of charge SOC and the calibration of the recognized state of charge SOCr. Even when the fuel cut operation is performed before the elapsing of the prescribed time period Td from the restarting of the engine in the idle stop operation, if the fuel cut operation does not last for more than the prescribed determination time period Tr required for the charge state determination unit 22 to determine the state of charge SOC, the charge control unit 26 forces the charging of the battery 13 for the determination of the state of charge SOC and the calibration of the recognized state of charge SOCr. Also, even when the fuel cut operation is performed before the idle stop has been performed by a prescribed number of times (three times in the illustrated embodiment), as long as the fuel cut operation does not last for more than the prescribed determination time period Tr required to the charge state determination unit 22 to determine the state of charge SOC, at the time restarting the engine for the third idle stop operation, the charge control unit 26 forces the charging of the battery 13 for the determination of the state of charge SOC and the calibration of the recognized state of charge SOCr.

In other words, there are exceptions to the prohibition of charging imposed by the charge control unit 26. Such exceptions include a charging operation having a purpose other than maintaining the recognized state of charge SOCr to the prescribed upper limit value such as a charging operation for the calibration of the recognized state of charge SOCr and a charging operation during a fuel cut operation for raising the recognized state of charge SOCr and the actual state of charge SOCa without adversely affecting the fuel economy. Charging of the battery 13 may be performed during a fuel cut operation as no fuel is consumed even when the recognized state of charge SOCr is higher than the prescribed upper limit value. Charging the battery 13 in a fuel cut operation when the recognized state of charge SOCr is lower than the upper limit value causes the recognized state of charge SOCr to regain the prescribed upper limit value, but may be considered as being distinct from the charging of the battery 13 by consuming the fuel for this particular purpose.

When a terminal disconnection signal TF is received, even if the integrated charge/discharge value IW of the battery 13 has not reached the prescribed discharge value (−20%), the discharge control is terminated, and the normal control process is resumed, if a state of charge SOC of less than 80% is determined as a result of an exceptional charging event, and the recognized state of charge SOC is corrected to this value, and if a prescribed number (30 times in the illustrated embodiment) of idle stop signals IS have been received.

Referring to the flowcharts shown in FIG. 3 to FIG. 9, the various control processes such as the charging control performed by the charging control device 10 according to the illustrated embodiment are described in the following.

Figure 3:
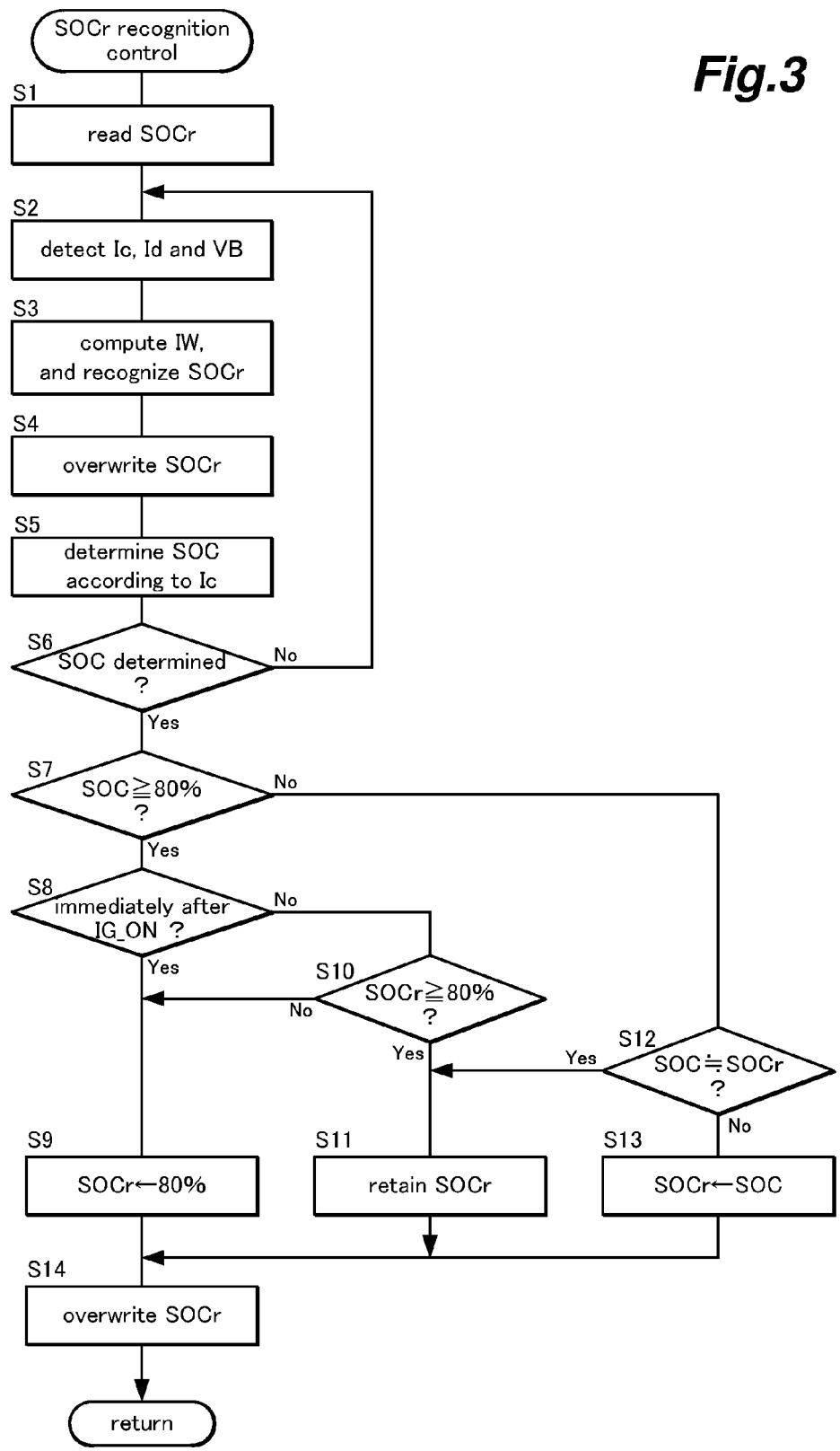
FIG. 3 is a flowchart showing the control process of recognizing a state of charge.

FIG. 3 shows the control process for recognizing the recognized state of charge SOCr performed by the ECU 17. When the ECU 17 (state of charge computation unit 21) is powered, for instance, by setting the ignition switch of the vehicle 1 to an accessory on (ACC-ON) position, the recognition control for recognizing the recognized state of charge SOCr as shown in FIG. 3 is performed as shown in FIG. 3.

First of all, the ECU 17 reads and recognizes the recognized state of charge SOCr stored in non-volatile memory at the end of the previous operation of the vehicle (step S1). Thereafter or at the same time, the ECU 17 detects a charge current Ic, a discharge current Id and a terminal voltage VB (step S2), and computes the integrated charge/discharge value IW to add the computed integrated charge/discharge value IW to the recognized state of charge SOCr so that the recognized state of charge SOCr may be recognized (or updated) (step S3). The ECU 17 overwrites the recognized state of charge SOCr into the non-volatile memory (step S4). If the charge current Ic has been received for more than the determination time period Tr, the ECU 17 determines the state of charge SOC of the battery 13 (step S5). If the state of charge SOC is not determined in step S5, and the determination result of step S6 is No, the ECU 17 repeats the process in step S2 to step S5, and overwrites the recognized state of charge SOCr into the memory as required.

The state of charge SOC is determined in step S5, and if the determination result of step S6 is Yes, the ECU 17 determines if the determined state of charge SOC is higher than the upper limit value or higher than 80% (step S7). If the state of charge SOC is higher than 80% (step S7: Yes), the ECU 17 determines if the determination of the state of charge SOC took place immediately after the ignition on signal IG-ON is received or was the one performed for the first time after the restarting of the engine (step S8). If the state of charge SOC was determined immediately after the engine was restarted (step S8: Yes), the ECU 17 regards the determined state of charge SOC as being 80%, and correct the recognized state of charge SOCr to the determined state of charge SOC or 80% (step S9).

If the state of charge SOC was not the one that was determined immediately after the engine is started (No) in step S8, the ECU 17 determines if the current recognized state of charge SOCr is higher than 80% (step S10), and if the recognized state of charge SOCr is lower than 80% (No) in step S10, the process of step S9 is executed, or the determined state of charge SOC is regarded as 80%, and the recognized state of charge SOCr is corrected to the value (80%) of the determined state of charge SOC. If recognized state of charge SOCr is higher than 80% (Yes) in step S10, the ECU 17 retains the recognized state of charge SOCr computed (estimated) from the integrated charge/discharge value IW as a value more accurate than the determined state of charge SOC (step S12). In other words, the recognized state of charge SOCr is not corrected to the 80% value which is lower than the actual state of charge SOCa.

If the determined state of charge SOC is less than 80% (No) in step S7, the ECU 17 determines if the determined state of charge SOC is equal to or substantially (for instance, within a margin of ±0.5%) equal to the currently retained recognized state of charge SOCr (step S12), If the determined state of charge SOC is equal to or substantially equal to the currently retained recognized state of charge SOCr (Yes) in step S12, the program flow advances to step S11, and the ECU 17 retains the recognized state of charge SOCr. If the state of charge SOC differs from the recognized state of charge SOCr (No) in step S12, the ECU 17 corrects the recognized state of charge SOCr to the determined state of charge SOC which is determined to be lower than 80% (step S13).

Thereafter, the ECU 17 overwrites the corrected or retained recognized state of charge SOCr into the memory (step S14), and repeats the foregoing procedure. As the ECU 17 already retains the recognized state of charge SOCr, the recognized state of charge SOCr is not required to be read in step S1.

Figure 4:
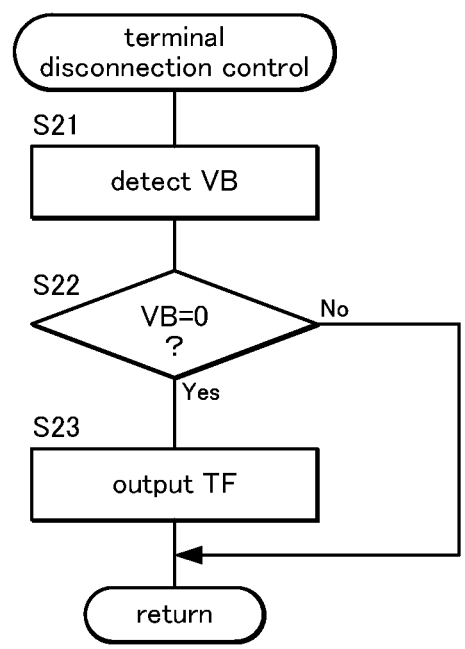
FIG. 4 is a flowchart showing the control process of detecting a terminal disconnection.

FIG. 4 shows the control process for detecting a terminal disconnection performed by the ECU 17. The ECU 17 (terminal disconnection detection unit 25) performs the control process for recognizing the recognized state of charge SOCr (shown in FIG. 4) constantly not only when the accessory on switch (ACC-ON) is ON but also when the accessory on switch (ACC-ON) is OFF. The control cycle for the detection of a terminal disconnection may be set to a relatively long period of time.

First of all, the ECU 17 detects the terminal voltage VB of the battery 13 (step S21), and determines if the terminal voltage VB is 0V (step S22). If the terminal voltage VB is 0V in step S22, the ECU 17 provides a terminal disconnection signal TF (step S23), and repeats the foregoing process. As the vehicle 1 is typically electrically turned off when the battery 13 is removed for replacement or other purposes, the ECU 17 records the terminal disconnection signal TF in the non-volatile memory in step S23.

Figure 5:
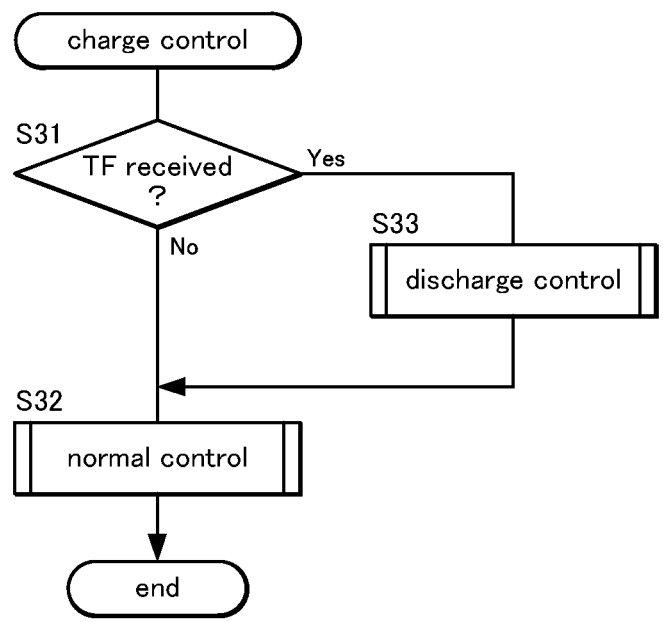
FIG. 5 is a flowchart showing the control process of charging.

FIG. 5 shows the control process for charging the battery 13 performed by the ECU 17. The ECU 17 (in particular, the charge control unit 26) starts the charge control shown in FIG. 5 following the starting of the engine 11, and continues the charge control during the time the engine 11 is operated.

First of all, the ECU 17 determines if a terminal disconnection signal TF has been produced or if a terminal disconnection signal TF is recorded in the memory (step S31). If a terminal disconnection signal TF is not recorded in the memory (step S31: No), the ECU 17 executes a normal control (step S32) which will be described hereinafter. If a terminal disconnection signal TF is recorded in the memory (step S31: Yes), the ECU 17 executes a discharge control (step S33) which will be described hereinafter. Upon completion of the discharge control of step S33, the program flow advances to step 32, and the ECU 17 executes the normal control.

Figure 6:
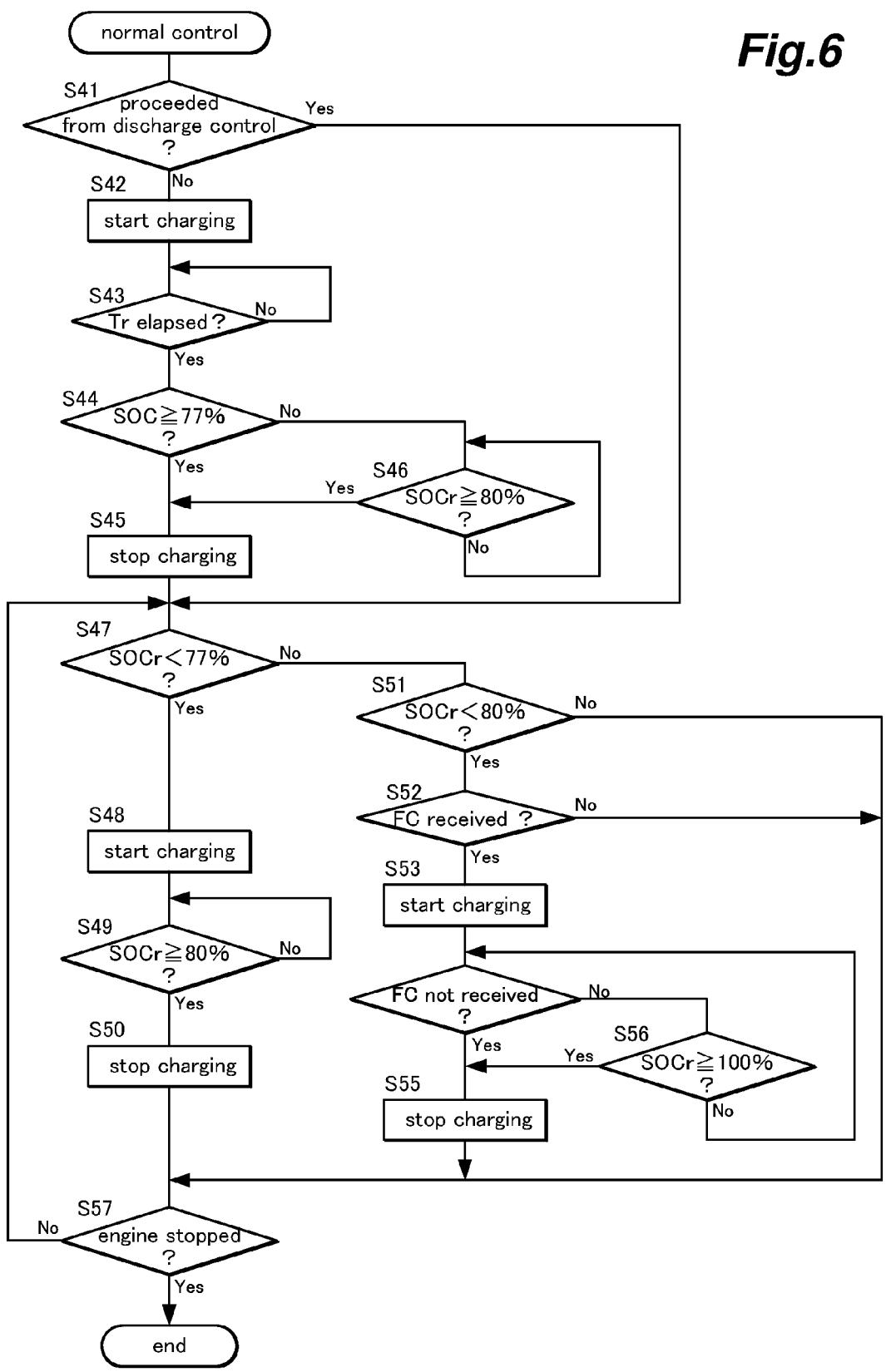
FIG. 6 is a flowchart showing the normal control process shown in FIG. 5.

FIG. 6 shows the normal control process in the charge control for the battery 13. First of all, the ECU 17 determines if the program flow has just proceeded from the discharge control (step S41). If the program flow has just proceeded from the discharge control (Yes), the program flow advances to step S47 which will be described hereinafter. If the program flow has not proceeded from the discharge control (No) or if the control process was initiated by the starting of the engine without any recorded terminal disconnection signal TF, the ECU 17 starts charging the battery 13 (step S42). The ECU 17 continues the charging until the prescribed determination time period Tr has elapsed so that the determination result of step S43 becomes Yes, or until the charge state determination unit 22 determines the state of charge SOC. Upon elapsing of the prescribed determination time period Tr (step S43: Yes), the ECU 17 determines if the determined state of charge SOC is higher than 77% (step S44). If the state of charge SOC is higher than 77% (step S44: Yes), the ECU 17 terminates the charging of the battery 13 (step S45).

On the other hand, if the determined state of charge SOC is lower than 77% (No) in step 44, the ECU 17 continues the charging until the retained recognized state of charge SOCr rises to 80%. In this case, the retained recognized state of charge SOCr is already corrected to the determined state of charge SOC or is substantially equal to the determined state of charge SOC. Once the recognized state of charge SOCr reaches 80% (step S46: Yes), the ECU 17 terminates the charging of the battery 13 (step S45).

Then, the ECU 17 determines if the recognized state of charge SOCr is lower than the lower limit value or 77% (step S47). If the ECU 17 has executed step S41-step S45 after the starting of the engine 11, the determination result of step S47 does not become Yes. If the recognized state of charge SOCr drops owing to a subsequent discharge event, and the determination result of step S47 becomes Yes, the ECU 17 starts charging the battery 13 (step S48). The ECU 17 continues the charging of the battery until the prescribed determination time period Tr has elapsed, and the determination result of step S49 becomes Yes or until the charge state determination unit 22 has determined the state of charge SOC. Once the prescribed determination time period Tr has elapsed (step S49: Yes), the ECU 17 terminates the charging of the battery 13 (step S45), and the program flow advances to step S57.

When the ECU 17 has executed the discharge control (FIG. 5), and has moved on to the current normal control following the starting of the engine 11, the determination result of step S47 may be No because the recognized state of charge SOCr is lower than the lower limit value of 77%. In such a case, the ECU 17 determines if the recognized state of charge SOCr is lower than 80% (step S51). If the determination result of step S51 is Yes, or if the recognized state of charge SOCr is higher than 77% but lower than 80%, the ECU 17 determines if the fuel cut signal FC has been forwarded to the ECU 17 or if the vehicle 1 has started a fuel cut operation (step S52). If the fuel cut signal FC has been forwarded (step S52: Yes), the ECU 17 starts charging the battery 13 (step S53).

Thereafter, the ECU 17 determines if the fuel cut signal FC has ceased or if the vehicle 1 has ended the fuel cut operation (step S54). If the fuel cut signal FC has ceased (Yes), the charging of the battery 13 is terminated (step S55). If the fuel cut signal FC has not ceased (step S54: No), the ECU 17 determines if the recognized state of charge SOCr has exceeded 100% (step S56), and continues the charging of the battery 13 by repeating the determination processes of step S54 and step S55 until the recognized state of charge SOCr exceeds 80%. If the fuel operation of the vehicle 1 persists until the recognized state of charge SOCr exceeds 100% (step S56: Yes) without losing the fuel cut signal FC (step S54: No), the program flow advances to step S55, and the ECU 17 stops charging the battery 13 before the program flow advances to step S57.

If the recognized state of charge SOCr is higher than 80% (No) in step S51, or although the recognized state of charge SOCr is lower than 80% (Yes) in step S51, but the determination result of step S52 is No owing to the absence of the fuel cut signal FC, the program flow advances to step S57.

The ECU 17 determines if the engine 11 has stopped in step S57, and if the engine has stopped (Yes), terminates the control process. If the determination result of step S57 is No without the engine 11 stopping, the ECU 17 repeats the process following step S47 and the subsequent steps. In other words, the ECU 17 either charges the battery 13 when the fuel cut operation is performed while the recognized state of charge SOCr is higher than the lower limit value of 77%, or forces the charging of the battery 13 to maintain the recognized state of charge SOCr to the upper limit value of 80% when the recognized state of charge SOCr falls below 77% without invoking the fuel cut operation.

FIG. 6 shows the discharge control process in the charge control for the battery 13. First of all, the ECU 17 starts charging the battery 13 (step S61). The ECU 17 continues the charging until the prescribed determination time period Tr has elapsed from the start of the charging, and the determination result of step S62 becomes Yes or until the charge state determination unit 22 determines the state of charge SOC. Upon elapsing of the determination time period Tr (step S62: Yes), the ECU 17 determines if the determined state of charge SOC is higher than 80% (step S63). If the state of charge SOC is less than 80% (step S63: No), the ECU 17 determines if the determined state of charge SOC is higher than 77% (step S64). If the determined state of charge SOC is higher than 77% (step S64: Yes), the ECU 17 terminates the charging of the battery 13 (step S65), and concludes the discharge control process.

If the determined state of charge SOC is lower than 77% in step S64 (step S64: No), the ECU 17 continues the charging until the recognized state of charge SOCr which has been corrected to the determined state of charge SOC reaches 80%. When the recognized state of charge SOCr reaches 80% (step S66: Yes), the ECU 17 stops charging the battery 13 (step S65), and the discharge control process is concluded.

If the determined state of charge SOC is higher than 80% (step S63: No) in step S63, the ECU 17 terminates the charging of the battery 13 (step S67). Then, the ECU 17 determines if the integrated charge/discharge value IW has subsequently fallen to −20%, or if the integrated charge/discharge value IW has reached the prescribed discharge value (step S68). If the integrated charge/discharge value IW is greater than −20% (No) in step S68, the ECU 17 performs the charge prohibition control (step S69) which will be described hereinafter. When the charge prohibition control is completed, and the determination result of step S70 (for the completion of the prohibition control) becomes Yes, the ECU 17 concludes this control process. If the charge prohibition control is not completed (step S70: No), the ECU 17 continues the charge prohibition control of step S69 until the integrated charge/discharge value IW falls below −20%, and the determination result of step S68 becomes Yes.

Figure 7:
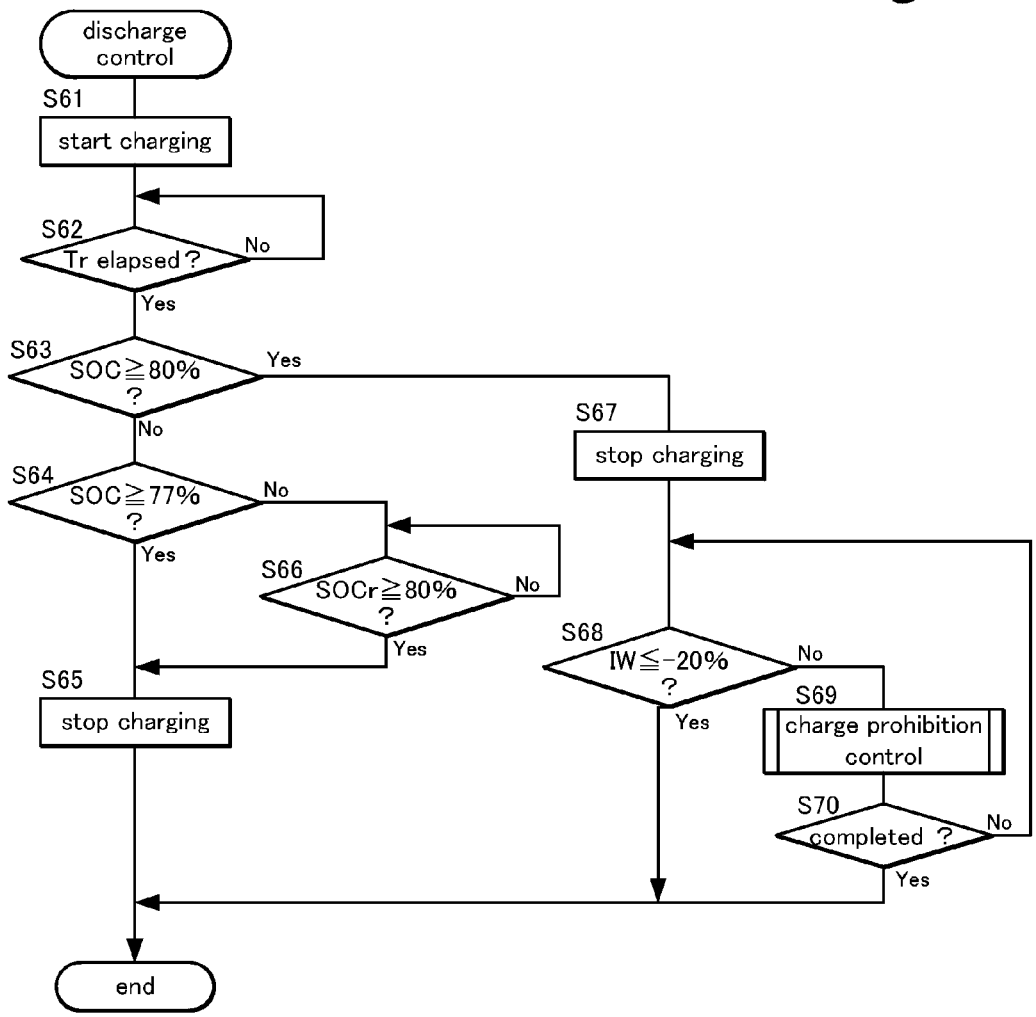
FIG. 7 is a flowchart showing the discharge control process shown in FIG. 5.
Figure 8:
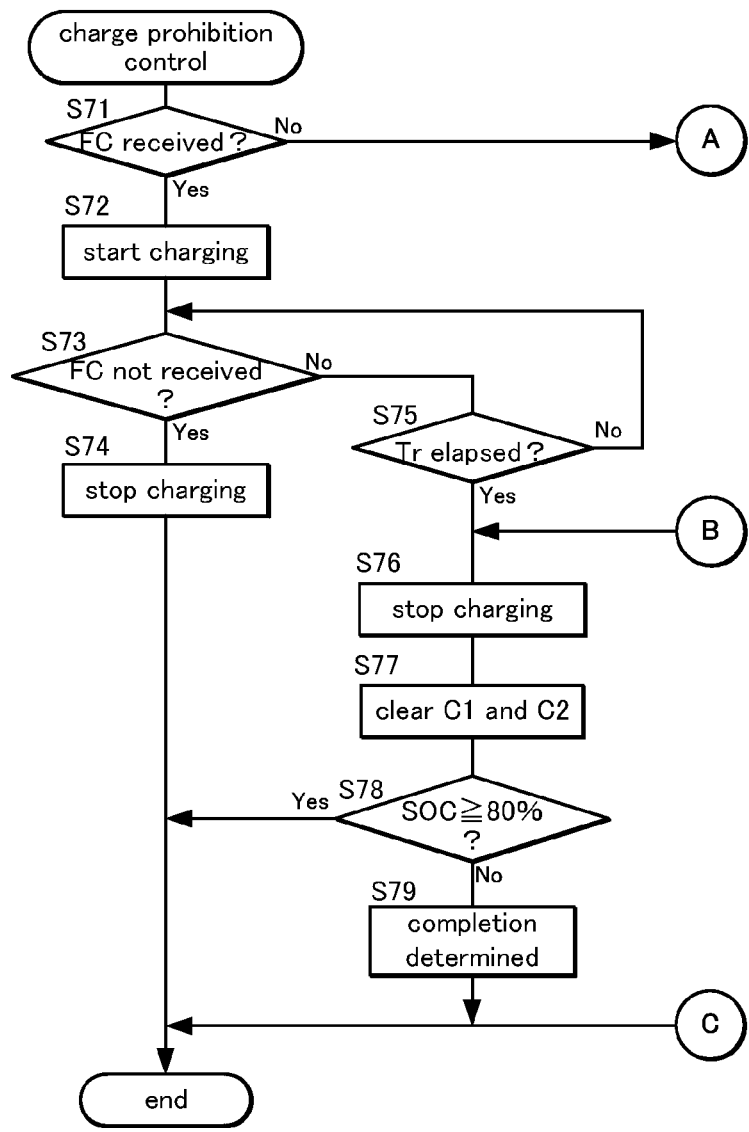
FIG. 8 is a flowchart showing the charging prohibition control process shown in FIG. 7.

FIG. 7 and FIG. 8 show the control process for prohibiting charging. First of all, the ECU 17 determines if a fuel cut signal FC has been received by the ECU 17 or if a fuel cut operation of the vehicle 1 has been initiated (step S71). If a fuel cut signal FC has been received (step S71: Yes), the ECU 17 starts charging the battery (step S72). Thereafter, the ECU 17 determines if the fuel cut signal FC has ceased to be received or the fuel cut operation of the vehicle 1 has been terminated (step S73), and if the fuel cut signal FC has ceased to be received (Yes), the ECU 17 stops charging the battery (step S74). In this case, the ECU 17 exits this control process, and the program flow advances to step S70 shown in FIG. 7. However, if the prohibition of charging is not quite concluded (No) in step S70, the program flow returns to step S71 shown in FIG. 8 to repeat the subsequent steps until the integrated charge/discharge value IW reaches −20%, and the determination result of step S68 changes to Yes.

As long as the fuel cut signal FC continues to be received (step S73: No) in step S73, the ECU 17 continues the charging until the prescribed determination time period Tr has elapsed since the start of the charging, and the determination result of step S75 changes to Yes, or until the charge state determination unit 22 has determined the state of charge SOC. Upon elapsing of the prescribed determination time period Tr (step S75: Yes), the ECU 17 stops charging the battery 13 (step S76), clears a first counter C1 and a second counter C2 (to zero) as will be described hereinafter (step S77), and determines if the determined state of charge SOC is higher than 80% (step S78). If the determined state of charge SOC is higher than 80% (step S78: Yes), the ECU 17 returns to step S70, and repeats the subsequent steps. If the determined state of charge SOC is lower than 80% (step S78: No), the ECU 17 determines the completion of the discharge prohibition control (step S79), and concludes the current discharge prohibition control. In this case, as the discharge control is concluded with the determination results of step S70 shown in FIG. 7 becoming Yes, the program flow of the ECU 17 advances to step S41 of the normal control process shown in FIG. 6.

Figure 9:
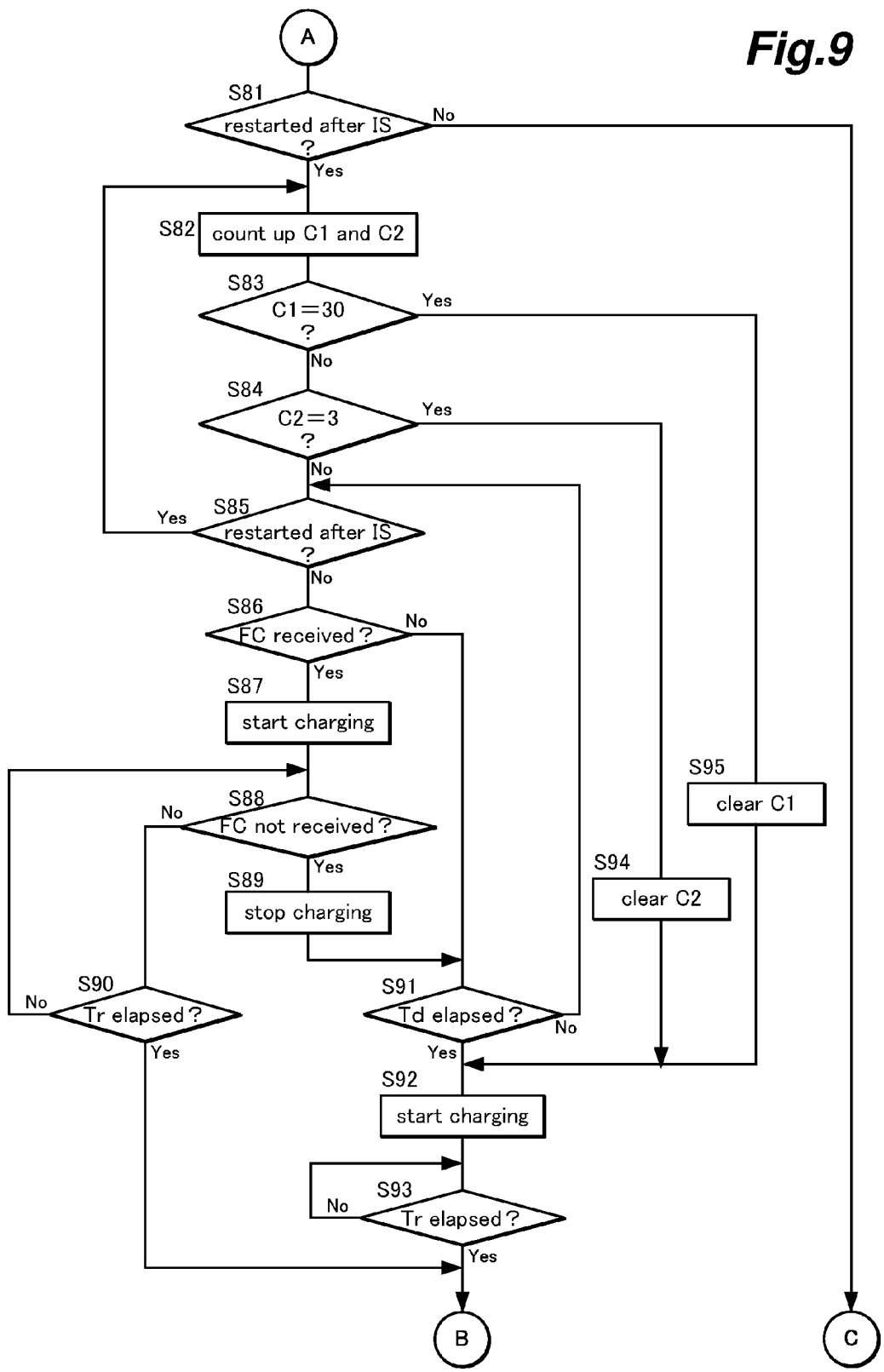
FIG. 9 is a flowchart showing the control process of charging prohibition shown in FIG. 7.

If no fuel cut signal FC is received in step S71, and the determination result of step S71 is therefore No, the program flow of the ECU 17 advances to step S81 shown in FIG. 9. In step S81, the ECU 17 determines if the restarting of the engine 11 (which may be referred to as "IS restart" in this flowchart and the associated description) has occurred after the idle stop signal IS has been received by the ECU 17 (step S81). If the IS restart has not been performed (step S81: No), the current control process is concluded without passing through step S79 of FIG. 8, but the program flow keeps returning to step S71 of FIG. 8 via step S70 until the determination result of step S68 shown in FIG. 7 becomes Yes.

If an IS restart is detected in step S81 (Yes), the ECU 17 counts up the first counter C1 and the second counter C2 by adding 1 to each counter (step S82). Thereafter, the ECU 17 determines if the count of the first counter C1 is 30 (step S82). If the count of the first counter C1 is not 30 (or less 30) (step S83: No), the ECU 17 determines if the count of the second counter C2 is 3 (step S82). If the count of the second counter C2 is not 3 (or less than 3) (step S84: No), the ECU 17 determines if an IS restart has been detected (step S85). If the program flow has advanced from step S84 to step S85, this determination result is No so that the ECU 17 determines if a fuel cut signal FC has been received by the ECU 17 (step S86). If the fuel cut signal FC has been received (step S86: Yes), the ECU 17 starts charging the battery 13 (step S87).

Thereafter, the ECU 17 determines if the fuel cut signal FC has ceased to be received (step S88), and if the fuel cut signal FC has ceased to be received (Yes) in step S88, the ECU 17 stops charging the battery 13 (step S89). If the fuel cut signal FC has not ceased to be received (step S88: No), the ECU 17 continues the charging until the prescribed determination time period Tr has elapsed since the start of the charging, and the determination result of step S90 has become Yes, or in other words until the charge state determination unit 22 has determined the state of charge SOC. Upon elapsing of the prescribed determination time period Tr (step S90: Yes), the program flow advances to step S76 shown in FIG. 8, and the ECU 17 stops charging the battery 13 before the program flow advances to step S77 which was discussed earlier in this disclosure.

If the fuel cut signal FC has ceased to be received (step S88: Yes) before elapsing of the prescribed determination time period Tr from the start of the charging in step S87, the ECU 17 stops charging the battery 13 (step S89), and determines if the prescribed time period Td has elapsed since the preceding IS restart (step S81 or step S85) (step S91). If the fuel cut signal FC is not received (No) in step S86, the ECU 17 determines if the prescribed time period Td has elapsed since the preceding IS restart (step S91). If the prescribed time period Td has not elapsed since the preceding IS restart in step S91, the ECU 17 repeats the process in step S85 and the subsequent steps.

Once the prescribed time period Td has elapsed since the IS restart, and the determination result of step S91 becomes Yes, the ECU 17 starts charging the battery 13 (step S92). Thereafter, the ECU 17 continues the charging until the prescribed determination time period Tr has elapsed from the time point of starting the charging, and the determination result of step S93 becomes Yes, or until the charge state determination unit 22 has determined the state of charge SOC. Once the determination time period Tr has elapsed (step S93: Yes), the program flow advances to step S76 shown in FIG. 8 to terminate the charging, and execute the process of step S77 and the subsequent steps which were discussed earlier.

If the count of the second counter C2 is 3 (Yes) in step S84, the ECU 17 clears the second counter C2 (step S94), and the program flow advances to step S92. Similarly, if the count of the first counter C1 is 30 (Yes) in step S83, the ECU 17 clears the first counter C1 (step S95), and the program flow advances to step S92. In other words, the ECU 17 starts charging the battery 13 (step S92), and continues the charging until the charge state determination unit 22 has determined the state of charge SOC. Thereafter, the program flow advances to step S76 shown in FIG. 8 to terminate the charging, and execute the process of step S77 and the subsequent steps which were discussed earlier.

The mode of operation of the charge control performed by the charging control device 10 of the illustrated embodiment is described in the following with reference to the time charts shown in FIG. 10 to FIG. 13. In the drawings, the terms "idle stop" and "fuel cut" are abbreviated as "IS" and "FC", respectively. The suffix "t" used in the following disclosure to indicate time points is omitted and the various time points are denoted simply with numerals in the time charts.

Figure 10:
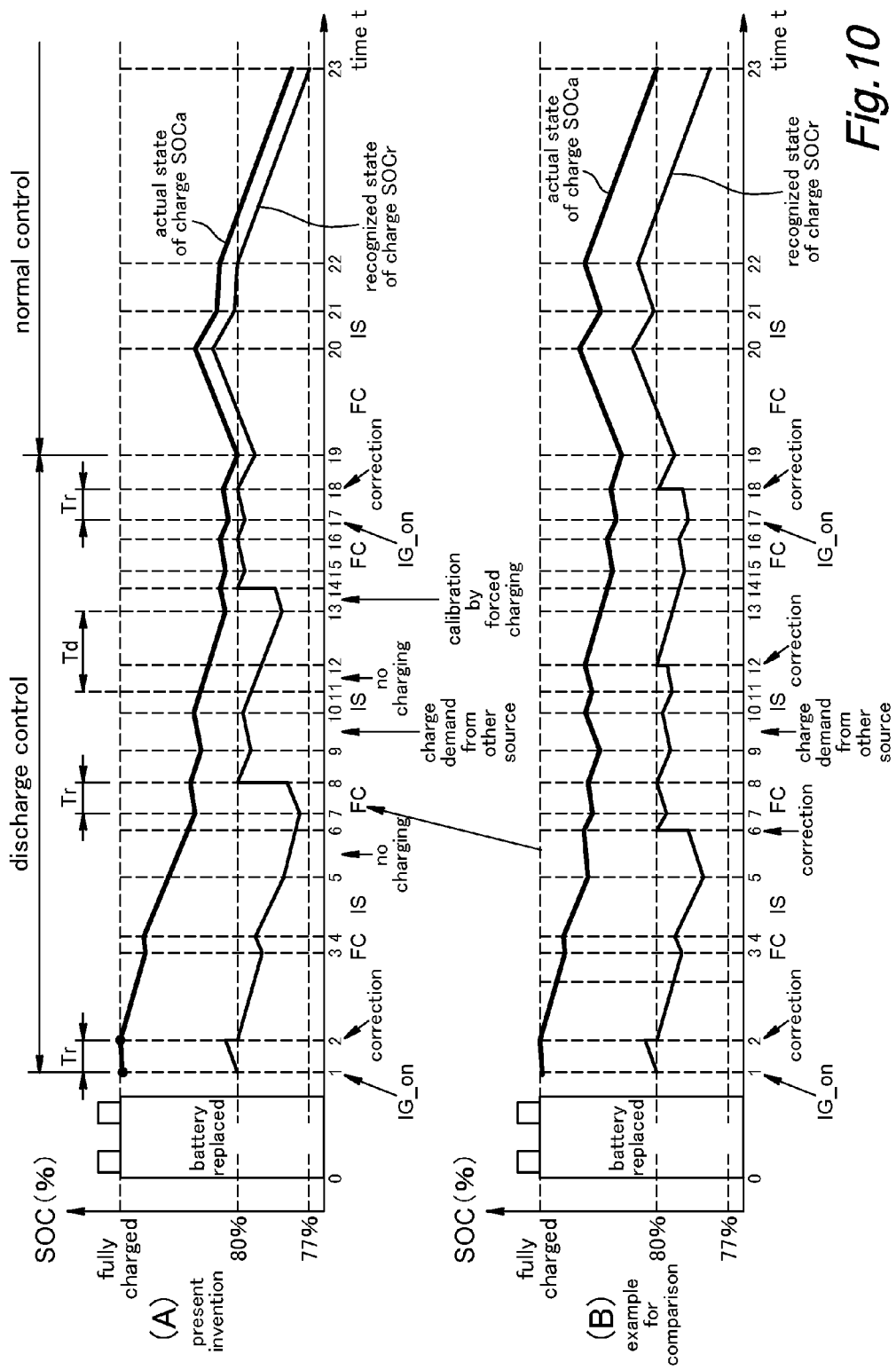
FIG. 10 includes time charts (A) and (B) showing the state of charge in the charging control process according to an embodiment of the present invention, and the state of charge in a charging control process according to an example for comparison, respectively.

A mode of operation is discussed in the following with reference to FIG. 10. In this example, at time point t0 where the recognized state of charge SOCr is at the upper limit value of 80%, the terminal of the battery 13 is disconnected for the replacement of the battery 13, and a fully charged new battery 13 is reconnected. (A) in FIG. 10 shows the time history of the charge when the discharge control of the present invention is used, and (B) in FIG. 10 shows the time history of the charge when the technology disclosed in Patent Document 2 is used. In these charts, of the various calibration events based at least on the charge current Ic, the correction of the recognized state of charge SOCr to the determined value is indicated as being "corrected".

As shown in (A) in FIG. 10, following the replacement of the battery 13, an ignition on signal IG-ON is received, and the engine 11 is started at time point t1. Then, owing to the fact that the charge control unit 26 charges the battery 13 for the prescribed determination time period Tr (time point t1-time point t2), the state of charge computation unit 21 determines the state of charge SOC according to at least the charge current Ic, and calibrates the recognized state of charge SOCr. At time point t2 where the determination process has completed, the state of charge SOC is regarded as being at the upper limit value of 80%, and the recognized state of charge SOCr is corrected to 80%. However, in reality, the actual state of charge SOCa of the battery 13 in question is 100%. If the actual state of charge SOCa before the charging was 100%, as no charge current Ic flows into the battery 13, the recognized state of charge SOCr would not increase. However, for the convenience of description, the recognized state of charge SOCr is indicated as being increased.

Thereafter, as electric power is supplied from the battery 13 to the load 19, and the recognized state of charge SOCr and the actual state of charge SOCa both decrease as a result, a fuel cut operation is started at time point t3, and the charge control unit 26 starts charging the battery 13. At this time, because the fuel cut operation does not last for the prescribed determination time period Tr that is required for the determination of the state of charge SOC, the recognized state of charge SOCr is not corrected. At time point t4, the fuel cut operation is taken over by an idle stop operation, and the recognized state of charge SOCr and the actual state of charge SOCa both decrease to time point t5.

In the control process of the example for comparison shown in (B) in FIG. 10, because the battery 13 is charged after the restarting of the engine 11 in an idle stop operation, the state of charge SOC is determined over the time period extending from time point t5 to time point t6, and the recognized state of charge SOCr is corrected at time point t6. Meanwhile, in the case of the discharge control of the present invention shown in (A) in FIG. 10, because the charge control unit 26 of the ECU 17 prohibits the charging of the battery 13 after the restart of the engine 11 in the idle stop operation, the recognized state of charge SOCr and the actual state of charge SOC continue to decline.

When the fuel cut operation is started at time point t7, the charge control unit 26 charges the battery 13 in both the discharge control of the present invention ((A) in FIG. 10), and the example for comparison ((B) in FIG. 10), but the correction of the recognized state of charge SOCr is performed only in the discharge control shown in (A) in FIG. 10. In the case of the discharge control shown in (A) in FIG. 10, because the correction of the recognized state of charge SOCr is performed for the first time at time point t8, the actual state of charge SOCa drops further than in the case of the example for comparison shown in (B) in FIG. 10.

Thereafter, in both the cases of (A) and (B) in FIG. 10, the recognized state of charge SOCr and actual state of charge SOCa both decline, and then go up (owing to the rise in the voltage of the AC generator 14 caused by an increased demand from the load 19) and down from time point t8 to time point t11. As the idle stop operation is performed over the time period of time point t10 to time point t11, in the case of (B) in FIG. 10, the battery 13 is charged over the time period of time point t11 to time point t12, and at the same time, the state of charge SOC is determined according to at least the charge current Ic with the result that the recognized state of charge SOCr and the actual state of charge SOCa start dropping at time point t12 where the recognized state of charge SOCr is corrected to the upper limit value.

On the other hand, in the case of the discharge control shown in (A) in FIG. 10, the integrated charge/discharge value IW (corresponding the change in the actual state of charge SOCa) of the battery 13 which does not take into account the amount of correction from time point t2 at which the correction immediately after the replacement of the battery took place does not reach the prescribed discharge value (−20%), the discharge control is still in progress so that the charging of the battery is not performed even after the idle stop operation over the time period of time point t10 to time point t11 has been performed. Therefore, the actual state of charge SOCa of (A) in FIG. 10 drops further than that of (B) in FIG. 10.

In the case of the discharge control shown in (A) in FIG. 10, as both the recognized state of charge SOCr and the actual state of charge SOCa decline following time point t12, because a fuel cut operation is not performed before the elapsing of the prescribed time period Td from time point t11 at which the engine 11 is restarted in the idle stop operation from time point t10 to time point t11, charging of the battery 13 is forced at time point t13, and the recognized state of charge SOCr is corrected at time point t14. Thereafter, as the fuel cut operation is performed over the time period of time point t15 to time point t16, the battery 13 is charged, but the recognized state of charge SOCr is not corrected because the time period of charging does not reach the required determination time period Tr in both the cases of (A) and (B) in FIG. 10.

As the ignition is turned off to stop the engine 11, and the ignition on signal IG-ON is received once again to start the engine 11 at time point t17, the charge control unit 26 charges the battery 13 over the prescribed determination time period Tr (time point t17 to time point t18) so that the recognized state of charge SOCr is corrected according to at least the charge current Ic. Thereafter, the recognized state of charge SOCr and the actual state of charge SOCa both decline from time point t18. In the case of (A) in FIG. 10, the integrated charge/discharge value IW of the battery 13 accumulated since the battery replacement reaches the prescribed discharge value (−20%), and the actual state of charge SOCa falls below 80% at time point t1. Therefore, the charge control unit 26 terminates the discharge control, and starts the normal control at time point t19. On the other hand, in the case of (B) in FIG. 10, the control process of the example for comparison is maintained.

When a fuel cut operation is started at time point t19, charging the battery 13 is started in both the cases of (A) and (B) in FIG. 10. At this time, the state of charge SOC is determined, but because the determined state of charge SOC is regarded as being 80%, and the recognized state of charge SOCr is higher than 80%, the recognized state of charge SOCr is not corrected. When an idle stop operation is performed from time point t20 to time point t21, in the case of (B) in FIG. 10, the battery 13 is charge, and the state of charge SOC is determined over the time period of time point t21 to time point t22 where the idle stop operation is terminated, but the recognized state of charge SOCr is not corrected at time point t22 because the determined state of charge SOC is regarded as being 80%, and the recognized state of charge SOCr is higher than 80%. On the other hand, in the case of (A) in FIG. 10, because the normal control is in progress or the recognized state of charge SOCr is higher than 80%, the battery 13 is not charged after the idle stop operation. Following time point t22, the recognized state of charge SOCr and the actual state of charge SOCa both decline. In the case of (B) in FIG. 10, the actual state of charge SOCa becomes 80% at time point t23.

Thus, when a disconnection of the terminal of the battery 13 is detected (S31: Yes), the charge control unit 26 performs the charge prohibition control until the integrated charge/discharge value IW reaches the prescribed discharge value (−20%) or until time point t19 to prohibit the charging of the battery 13 after the restarting of the engine in the idle stop operation, and allow the actual state of charge SOCa which was initially higher than the upper limit value to quickly converge to the upper limit value so that the battery 13 may be subsequently charged in an efficient manner, and the fuel economy may be improved.

When a disconnection of the battery 13 is detected, only if the determined state of charge SOC, and the recognized state of charge SOCr calibrated according to the determined state of charge SOC are lower than the upper limit value of 80% at time point t2, the charge control unit 26 performs the charge prohibition control (FIG. 8 and FIG. 9) to prohibit the charging of the battery 13 after the engine 11 is restarted in an idle stop operation. On the other hand, even when a disconnection of the battery 13 is detected, if the recognized state of charge SOCr immediately after starting the engine 11 is recognized as an accurate value because of being lower than the upper limit value, the battery 13 is charged so that the recognized state of charge SOCr may be always maintained at the upper limit value.

If a disconnection of the battery 13 is detected (step S31: Yes), even during the discharge control process, the recognized state of charge SOCr is corrected to a more accurate value by calibrating the recognized state of charge SOCr by using the value determined by the state of charge computation unit 21 according to at least the charge current Ic when the battery 13 is being charged in a fuel cut operation (step S72; time point t7-time point t8). Because the recognized state of charge SOCr is calibrated during the charging process in a fuel cut operation, no fuel is required to be consumed for the calibration so that the fuel economy is not adversely affected.

Another mode of operation is described in the following with reference to FIG. 11. In the example shown in FIG. 11, although the actual state of charge SOCa is not shown, the actual state of charge SOCa is maintained above the upper limit value of 80% after the replacement of the battery 13, and the calibration is forced during the process of the actual state of charge SOCa approaching the upper limit value if a fuel cut operation is not performed within the prescribed time period Td after the restarting of the engine 11 in an idle stop operation, or if, even though a fuel cut operation is performed, the duration of the fuel cut operation is shorter than the prescribed determination time period Tr so that the recognized state of charge SOCr cannot be calibrated.

Figure 11:
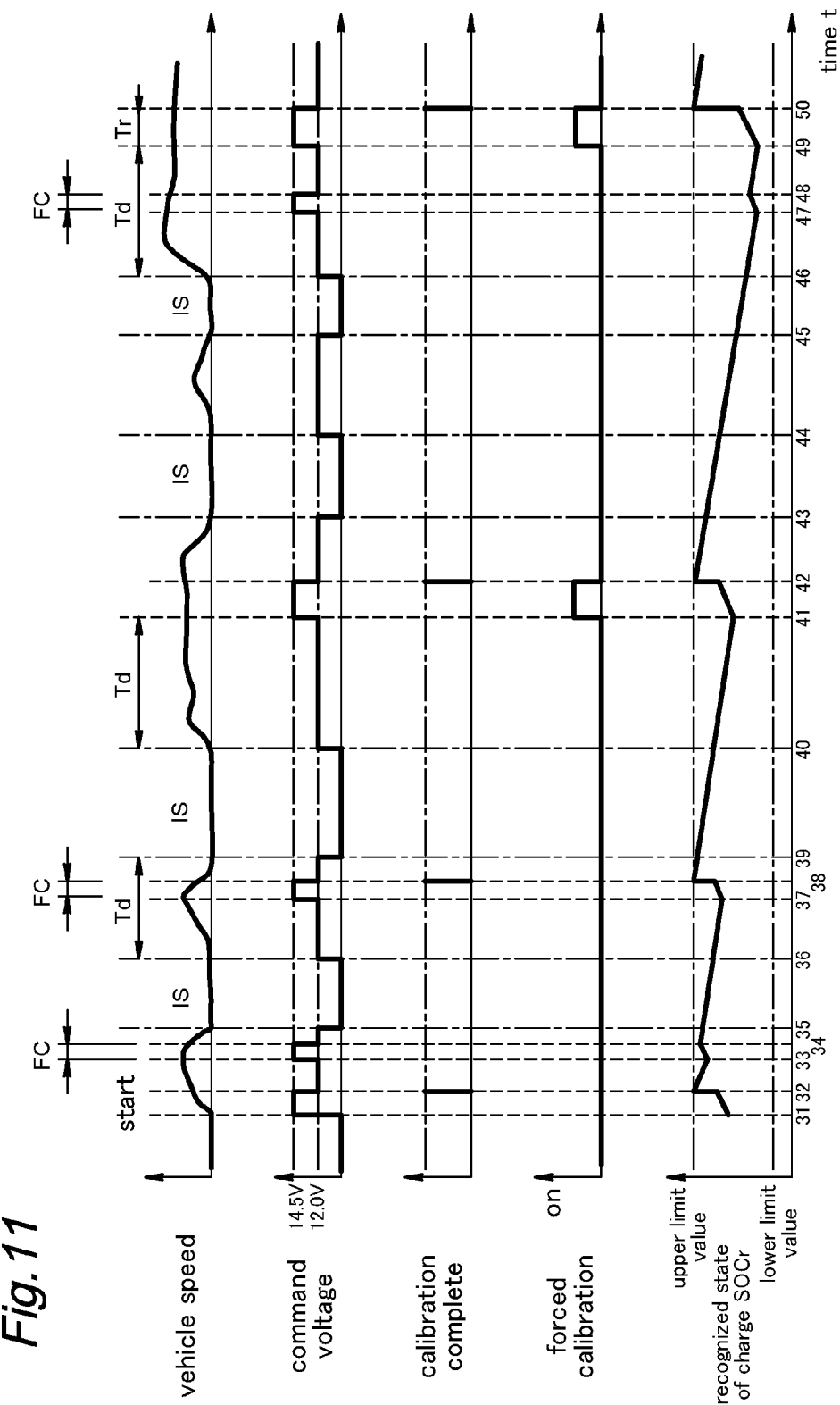
FIG. 11 is a time chart showing the state of charge in the charging control process according to the embodiment of the present invention.

As shown in FIG. 11, an ignition on signal IG-ON is received, and the engine 11 is started at time point t31. The vehicle 1 is started, and the vehicle speed starts increasing. The command voltage for the AC generator 14 is 14.5V (therefore, the battery 13 is charged). At time point t32, the recognized state of charge SOCr is corrected to the upper limit value, and the command voltage is set to 12.0V (hence, the battery 13 is not charged). From time point t32 to time point t33, the recognized state of charge SOCr declines. From time point t33 to time point t34, a fuel cut operation is performed, and the command voltage is set to 14.5V to charge the battery 13, but the recognized state of charge SOCr is not calibrated.

At time point t35, the vehicle 1 comes to a stop, and an idle stop operation is initiated. Because the engine 11 is not running, no command voltage is produced, and as the power required by the load 19 is supplied solely by the battery 13, the recognized state of charge SOCr declines. At time point t36, the engine 11 is restarted as a part of the idle stop operation. As the charge control unit 26 prohibits the charging of the battery 13, the recognized state of charge SOCr continues to decline. A fuel cut operation is performed from time point t36 at which the engine is restarted in the idle stop operation. The fuel cut operation continues during the time period of time point t37 to time point t38 which precedes time point t39 at which the prescribed time period Td expires, and the battery 13 is charged during this period. At time point t38, the recognized state of charge SOCr is calibrated, and the state of charge computation unit 21 corrects the recognized state of charge SOCr to the upper limit value once again.

Thereafter, an idle stop operation is performed between time point t39 and time point t40, and the engine 11 is restarted at time point t40, but the charging of the battery 13 is prohibited. Because a fuel cut operation is not initiated from time point t40 where the engine is restarted in the idle stop operation to time point t41 at which the prescribed time period Td has elapsed, at time point t41, a forced calibration or a forced charging of the battery 13, and the determination of the state of charge SOC according to at least the charge current Ic are initiated, and the recognized state of charge SOCr is calibrated at time point t42. The recognized state of charge SOCr is corrected to the upper limit value by the state of charge computation unit 21 once again.

From time point t43 to time point t44, an idle stop operation is initiated once again, and at time point t44, the engine 11 is restarted. Because the vehicle 1 comes to a stop followed by the idle stop operation without a fuel cut operation being invoked before the expiration of the prescribed time period Td, the forced calibration is not performed. At time point t46, the engine 11 is restarted, and from time point t47 to time point t4 or before the expiration of the prescribed time period Td from time point t46, a fuel cut operation is performed, and the battery 13 is charged during this period, but the calibration is not performed because the fuel cut operation was not performed for the required determination time period Tr. In this case, from time point t49 at which the prescribed time period Td has elapsed from time point t46, the forced charging of the battery 13 for the prescribed determination time period Tr, and the determination of the state of charge SOC according to at least the charge current Ic are performed, and the recognized state of charge SOCr is calibrated at time point t50.

In this way, if a disconnection of a terminal of the battery 13 is detected, and a fuel cut operation is not initiated before the expiration of the prescribed time period Td from time point t40 at which the engine is restarted in an idle stop operation, by causing the charge control unit 26 to force the charting of the battery 13, the state where the recognized state of charge SOCr cannot be calibrated is prevented from persisting for a prolonged period of time from time point t40 at which the engine is restarted in the idle stop operation. Therefore, the recognized state of charge SOCr is prevented from keeping declining while deviating from the actual state of charge SOCa.

If a fuel cut operation lasting for more than the prescribed determination time period Tr that is required for the state of charge computation unit 21 to determine the state of charge SOC is not performed before the prescribed time period Td has elapsed from time point t46 at which the engine is restarted in an idle stop operation or if even though a fuel cut operation was performed, the fuel cut operation lasted for less than the determination time period Tr from time point t47 to time point t48, the charge control unit 26 forces the charging of the battery 13 at time point t49 where the prescribed time period Td has elapsed so that the state of charge computation unit 21 may be enabled to calibrate the recognized state of charge SOCr.

As opposed to this, FIG. 13 shows the mode of operation of the example for comparison using the technology disclosed in Patent Document 2, instead of the discharge control of the present invention. This mode of operation is described in the following.

At time point t71, an ignition on signal IG-ON is received, the engine 11 is started, and the charging of the battery 13 is started. At time point t7, the recognized state of charge SOCr is calibrated. The recognized state of charge SOCr is corrected to the upper limit value. From time point t73 to time point t74, a fuel cut operation is performed, and the battery 13 is charged once again, but the recognized state of charge SOCr is not calibrated.

At time point t75, the vehicle 1 comes to a stop, and an idle stop operation is initiated. During the time the idle stop operation is continued, the recognized state of charge SOCr keeps declining. When the engine 11 is restarted at time point t76, the charging of the battery 13 is started, and at time point t77, the recognized state of charge SOCr is calibrated. The recognized state of charge SOCr is corrected to the upper limit value once again. From time point t78 to time point t79, a fuel cut operation is performed, and the battery 13 is charged once again. At this time, the recognized state of charge SOCr is not calibrated.

From time point t80 to time point t81, an idle stop operation is performed. At time point t81 where the engine is restarted in the idle stop operation, and at time point t82, the recognized state of charge SOCr is calibrated. Up to time point t83 where an idle stop operation is initiated, a fuel cut operation is not performed, and in this case, the battery 13 is not charged. After the idle stop operation is terminated, from time point t83 to time point t84, the battery 13 is charged, and at time point t85, the recognized state of charge SOCr is calibrated. Thereafter, also from time point t87 to time point t88, following an idle stop operation, the battery 13 is charged, and at time point t88, the recognized state of charge SOCr is calibrated.

As can be appreciated from the foregoing, in the case of the control process of the example for comparison, the battery 13 is charged so frequently that the actual state of charge SOCa maintains high values for prolonged periods of time so that the charging efficiency is impaired. On the other hand, when the ECU 17 of the charge control unit 26 performs the discharge control of the present invention, the frequency of charging the battery 13 is reduced as shown in FIG. 11. Therefore, the actual state of charge SOCa goes down to the upper limit value quickly so that the fuel economy is not impaired.

Figure 12:
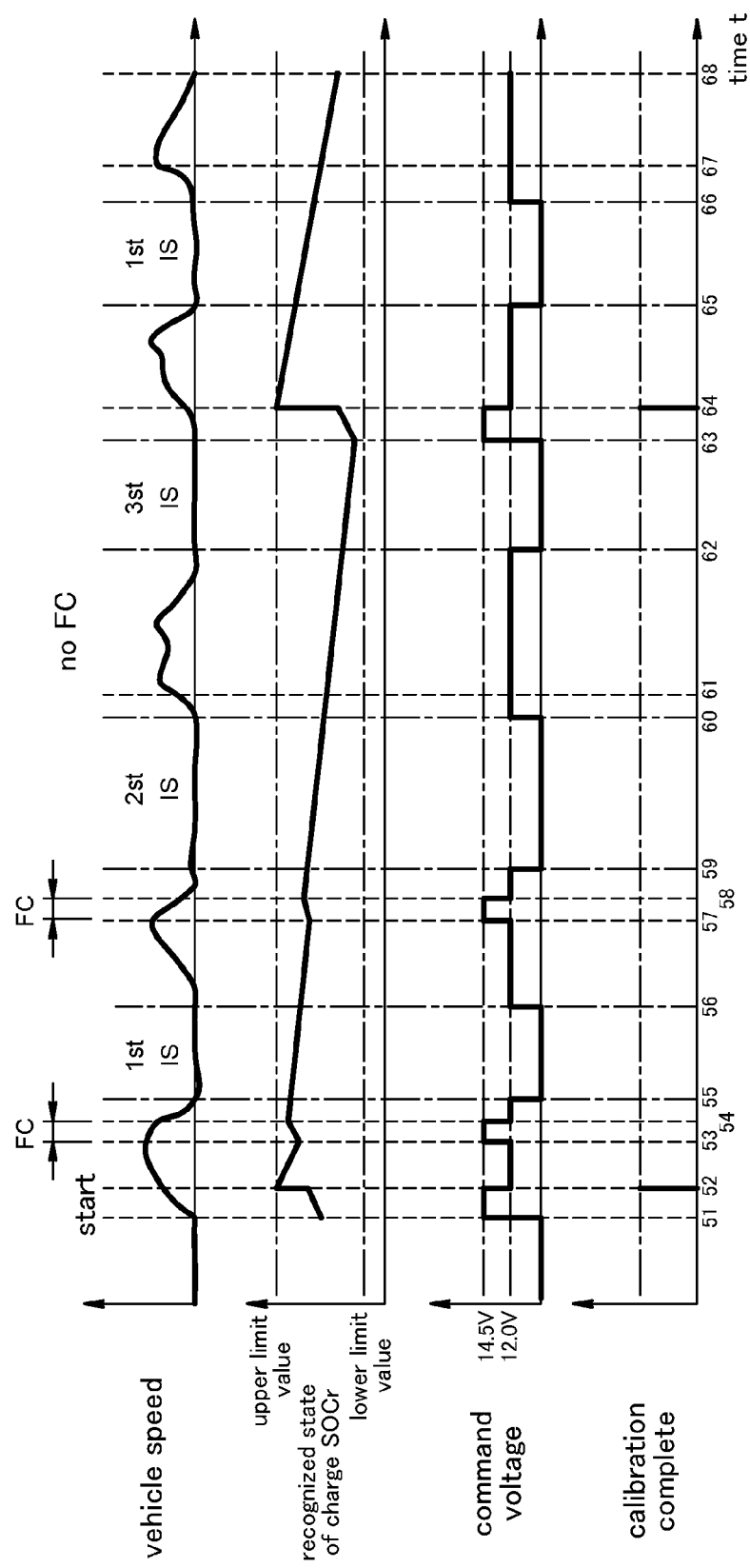
FIG. 12 is a time chart showing the state of charge in the charging control process according to the embodiment of the present invention.

Lastly, yet another example for comparison is described in the following with reference to FIG. 12. In FIG. 12 also, the actual state of charge SOCa is not shown. In this example, following the replacement of the battery, the actual state of charge SOCa is kept above the upper limit value of 80%. Therefore, during the time the actual state of charge SOCa gradually approaches the upper limit value, a fuel cut operation is not performed between an idle stop operation and a succeeding idle stop operation. Even if a fuel cut operation is performed, the duration of the fuel cut operation is shorter than the prescribed determination time period Tr, and, therefore, the recognized state of charge SOCr cannot be calibrated so that the charging of the battery is required to be forced.

As shown in FIG. 12, at time point t51, an ignition on signal IG-ON is received, and engine 11 is started. At the same time, the vehicle 1 starts moving, and the vehicle speed gradually increases. The command voltage for the AC generator 14 is 14.5V (so that the battery 13 is charged). At time point t52, the recognized state of charge SOCr is calibrated such that the recognized state of charge SOCr is corrected to the upper limit value, and the command voltage is set to 12.0V (so that the battery 13 is not charged). From time point t52 to time point t53, the recognized state of charge SOCr gradually declines, and from time point t53 to time point t54, a fuel cut operation is performed. At the same time, the command voltages is set to 14.5V, and the charging of the battery 13 is started, but the recognized state of charge SOCr is not calibrated.

At time point t55, the vehicle 1 comes to a stop, and from time point t55 to time point t56, a first idle stop operation is performed. Although the engine 11 is restarted at time point t56 in the idle stop operation, as the discharge control by the charge control unit 26 is in progress, the battery 13 is not charged. From time point t57 to time point t58, a fuel cut operation is performed, and the battery is charged during this time period. However, because the duration of the fuel cut operation is shorter than the prescribed determination time period Tr required for the determination of the state of charge SOC, the recognized state of charge SOCr is not calibrated.

Thereafter, from time point t59 to time point t60, a second idle stop operation is performed, and the engine 11 is restarted at time point t60, but it is prohibited to charge the battery 13. The vehicle 1 travels from time point t60 to time point t62, but no fuel cut operation takes place. From time point t62 to time point t63, a third idle stop operation is performed. Prior to this idle stop operation lasting to time point t63, a fuel cut operation was performed from time point t57 to time point t58, but did not last until the determination time period Tr expired. Therefore, once the engine 11 is restarted at time point t63, the forced calibration or the forced charging of the battery 13 is performed, and the state of charge SOC is determined according to at least the charge current Ic so that the recognized state of charge SOCr is calibrated at time point t64. As a result, the recognized state of charge SOCr is corrected to the upper limit value by the state of charge computation unit 21. As the recognized state of charge SOCr is corrected, the idle stop count stored in the second counter C2 is reset.

Thereafter, as an idle stop operation is performed once again from time point t65 to time point t66, this idle stop is counted as the first idle stop, and the engine 11 is restarted at time point t66, but the battery 13 is not charged. Thereafter, the occurrence of idle stop operations is counted in a similar fashion, and if a fuel cut operation lasting for more than the determination time period Tr does not occur before the third idle stop operation is initiated, a forced charging of the battery 13 and the calibration of the recognized state of charge SOCr are performed following the restarting of the engine in the third idle stop operation.

In this manner, if a fuel cut operation lasting for more than the determination time period Tr required for the state of charge computation unit 21 to determine the state of charge SOC does not occur before the third idle stop operation is initiated at time point t62, the charge control unit 26 forces the charging of the battery 13 at time point t63 where the engine is restarted in the third idle stop operation so that an undesirable situation can be avoided where the engine 11 is abruptly restarted during an idle stop operation for forcing the charging of the battery owing to the falling of the recognized state of charge SOCr to the discharge lower limit value. Also, before the recognized state of charge SOCr reaches the discharge lower limit value, the state of charge computation unit 21 may calibrate the recognized state of charge SOCr.

Although the present invention has been described in terms of a preferred embodiment thereof, it is obvious to a person skilled in the art that various alterations and modifications are possible without departing from the scope of the present invention. For instance, the specific structures, arrangements, quantities, values and control modes of and for various members and parts may be modified without departing from the spirit of the present invention. All of the various components of the charging control device 10 of the vehicle 1 of the illustrated embodiment described above are not entirely essential for the present invention, but can be selected and omitted without departing from the spirit of the present invention.

1 vehicle
10 charging control device
11 engine
13 battery (secondary battery)
14 AC generator
15a current sensor (discharge current detection unit)
15b current sensor (charge current detection unit)
16 voltage sensor (terminal disconnection detection unit)
17 ECU
22 charge state determination unit
23 charge/discharge integration unit
24 charge state recognition unit
25 terminal disconnection detection unit
26 charge control unit
FC fuel cut signal
IS idle stop signal
IW integrated charge/discharge value
Ic charge current
SOC state of charge

The invention claimed is:

1. A charging control device for controlling a charging of a secondary battery with a generator driven by an engine, comprising:
a charge current detection unit configured to detect a charge current supplied to the secondary battery;
a discharge current detection unit configured to detect a discharge current supplied from the secondary battery;
a charge/discharge integration unit configured to compute an integrated charge/discharge value of the secondary battery according to the charge current and the discharge current;
a state of charge determination unit configured to determine a state of charge of the secondary battery according to the charge current while the secondary battery is being charged;
a state of charge recognition configured to recognize a state of charge of the secondary battery according to the integrated charge/discharge value as a recognized state of charge and to calibrate the recognized state of charge according to the state of charge determined by the state of charge determination unit;
a charge control unit configured to control the charging of the secondary battery such that the recognized state of charge is maintained at a prescribed upper limit value lower than a fully charged state by switching a generation voltage of the generator, the charge control unit being configured to charge the secondary battery over a prescribed determination time period required for the state of charge determination unit to determine the state of charge immediately after a starting of the engine; and
a terminal disconnection detection unit configured to detect a disconnection of a terminal of the secondary battery;
wherein the charge control unit is configured such that when a disconnection of the terminal of the secondary battery is detected, a secondary battery is reconnected after the disconnection, and a state of charge of the reconnected secondary battery as determined immediately after a subsequent starting of the engine is higher than the prescribed upper limit value, the charge control unit prohibits the charging of the reconnected secondary battery until the integrated charge/discharge value computed since the reconnection of the secondary battery reaches a prescribed discharge value.

2. The charging control device according to claim 1, wherein the charging control device is mounted on a vehicle, and the charge control unit is configured to charge the secondary battery during a fuel cut operation of the vehicle, and wherein the state of charge recognition unit is configured to calibrate the recognized state of charge when the disconnection of the terminal of the secondary battery is detected by using the state of charge of the reconnected secondary battery determined by the state of charge determination unit during the charging of the secondary battery in the fuel cut operation.

3. The charging control device according to claim 2, wherein the vehicle is configured to perform an idle stop operation, and the charge control unit is configured to force the charging of the reconnected secondary battery over the prescribed determination time period when the disconnection of the terminal of the secondary battery is detected, and the fuel cut operation is not performed before elapsing of a prescribed time period from a time point of restarting the engine in the idle stop operation.

4. The charging control device according to claim 3, wherein the charge control unit is configured to force the charging of the reconnected secondary battery over the prescribed determination time period when the disconnection of the terminal of the secondary battery is detected, and the fuel cut operation lasting for more than the prescribed determination time period is not performed before elapsing of the prescribed time period from the time point of restarting of the engine in the idle stop operation.

5. The charging control device according to claim 3, the charge control unit is configured, when the disconnection of the terminal of the secondary battery is detected, and a fuel cut operation lasting for more than the prescribed determination time period is not performed before a prescribed number of idle stop operations have been performed, to force the charging of the reconnected secondary battery for the prescribed determination time period after the engine is restarted for the prescribed number of times in the idle stop operations.

6. A method for controlling a charging of a secondary battery from a generator driven by an engine, comprising the steps of:
- detecting a charge current supplied to the secondary battery;
- detecting a discharge current supplied from the secondary battery;
- computing an integrated charge/discharge value of the secondary battery according to the charge current and the discharge current;
- recognizing a state of charge of the secondary battery according to the integrated charge/discharge value as a recognized state of charge;
- controlling the charging of the secondary battery such that the recognized state of charge is maintained at a prescribed upper limit value lower than a fully charged state by switching a generation voltage of the generator;
- determining a state of charge of the secondary battery according to the charge current while the secondary battery is being charged;
- charging the secondary battery over a prescribed determination time period required to determine the state of charge immediately after a starting of the engine;
- calibrating the recognized state of charge according to the determined state of charge;
- detecting a disconnection of a terminal of the secondary battery; and
- when a disconnection of the terminal of the secondary battery is detected, a secondary battery is reconnected after the disconnection, and a state of charge of the reconnected secondary battery as determined immediately after a subsequent starting of the engine is higher than the prescribed upper limit value, prohibiting the charging of the reconnected secondary battery until the integrated charge/discharge value computed since the reconnection of the secondary battery reaches a prescribed discharge value.

* * * * *